(12) United States Patent  
Takeuchi et al.

(10) Patent No.: US 8,751,121 B2
(45) Date of Patent: Jun. 10, 2014

(54) SHIFT CONTROLLING APPARATUS FOR VEHICLE

(75) Inventors: Yoshiaki Takeuchi, Saitama (JP); Yukio Yokogawa, Saitama (JP); Eiji Kittaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 82 days.

(21) Appl. No.: 13/614,186

(22) Filed: Sep. 13, 2012

(65) Prior Publication Data

US 2013/0073156 A1    Mar. 21, 2013

(30) Foreign Application Priority Data

Sep. 21, 2011  (JP) ................................. 2011-206086

(51) Int. Cl.
*G06F 7/00* (2006.01)

(52) U.S. Cl.
USPC ....................................... 701/56; 180/65.265

(58) Field of Classification Search
USPC .................. 701/51, 56; 180/65.265
See application file for complete search history.

(56) References Cited

U.S. PATENT DOCUMENTS

| | | | |
|---|---|---|---|
| 4,625,590 A * | 12/1986 | Muller | 477/120 |
| 6,006,151 A * | 12/1999 | Graf | 701/57 |
| 6,070,118 A | 5/2000 | Ohta et al. | |
| 6,571,162 B2 * | 5/2003 | Kusafuka et al. | 701/51 |
| 6,684,143 B2 * | 1/2004 | Graf et al. | 701/51 |
| 6,801,845 B2 * | 10/2004 | Henneken et al. | 701/56 |
| 2002/0013650 A1 * | 1/2002 | Kusafuka et al. | 701/51 |
| 2011/0196584 A1 * | 8/2011 | Fox et al. | 701/51 |

FOREIGN PATENT DOCUMENTS

| | | |
|---|---|---|
| DE | 10032906 A1 | 3/2001 |
| DE | 10021770 A1 | 11/2001 |
| DE | 69708483 T2 | 7/2002 |
| DE | 10116545 A1 | 10/2002 |
| DE | 102006005858 A1 | 8/2007 |
| JP | 08-210487 A | 8/1996 |
| WO | 97/25555 A1 | 7/1997 |

* cited by examiner

*Primary Examiner* — Helal A Algahaim
*Assistant Examiner* — Shardul Patel
(74) *Attorney, Agent, or Firm* — Carrier Blackman & Associates, P.C.; Joseph P. Carrier; William D. Blackman

(57) ABSTRACT

Shift controlling apparatus for a vehicle which automatically carries out changeover between a plurality of shift gear stages based on an automatic shift map including a drive mode shift map and a sport mode shift map having an increased region in which a speed change ratio is low compared to the drive mode shift map and corresponds to more sporty operation than that of the drive mode shift map. The drive mode shift map has a first mode portion and a second mode portion having an increased region in which the change gear ratio is low compared to the first mode portion, but smaller than the increased region of the sport mode shift map. Changeover between the first and second mode portions is carried out based on an acceleration history in accordance with a throttle opening of the vehicle.

12 Claims, 22 Drawing Sheets

SHIFT CONTROLLING APPARATUS FOR VEHICLE

TECHNICAL FIELD

This invention relates to a shift controlling apparatus, and more particularly to such an apparatus for a vehicle such as a motorcycle.

BACKGROUND ART

Japanese Patent Laid-Open No. Hei 8-210487 discloses a technique wherein different shift maps are provided for one range and are selectively used in response to a running state. For example, a technique is disclosed wherein, where a shift lever is fixed to the "1" range, the gradient during running is decided, and on a downhill, a downhill map is automatically selected to permit shift down, but on an uphill or a flat other than a downhill, an uphill map or a flat road map is automatically selected to permit shift up without the necessity for operating the shift lever to the "D" range.

The known technique is specialized to a case of shift at the "1" range and the "2" range and is particularly effective where the vehicle runs on a road along which an uphill and a downhill repetitively appear. However, in such a case that the vehicle continuously runs in the "1" range or the "2" range or in a like case, the known technique is not very advantageous if the fuel cost, engine noise and so forth are taken into consideration. Further, since a sensor for detecting the gradient is required, the cost increases.

SUMMARY OF THE INVENTION

Therefore, it is an object of the present invention to provide a shift controlling apparatus which provides, in a running state over a wide range from running in the city to running on an uphill or a downhill such as a road over a mountain pass, appropriate running without using gradient detection means or the like, eliminates the necessity for frequent shifting operations, and makes smooth running possible.

In order to achieve the object described above, a first aspect of the present invention provides a shift controlling apparatus (150) which comprises: an automatic shift map (230) in which at least shift timings corresponding to vehicle speeds are set and which automatically carries out changeover between a plurality of shift gear stages based on the automatic shift map (230). The automatic shift map (230) has a drive mode shift map (240) corresponding to ordinary running as a whole and a sport mode shift map (242) which has a increased region in which the speed change ratio is low compared to the drive mode shift map (240) and corresponds to more sporty running/operation than that of the drive mode shift map (240), while the drive mode shift map (240) has a first mode portion (250) which is a basic shift map and a second mode portion (252) which has a increased region in which the change gear ratio is low compared to the first mode portion (250), and the increased region of the second mode portion (252) in which the speed change ratio is low compared to first mode portion (250), is smaller than the increased region of the sport mode shift map (242). The shift controlling apparatus (150) further comprises: a mode selection section (220) for selecting one of the drive mode shift map (240) and the sport mode shift map (242); and a drive mode map changeover section (222) for carrying out, when the mode selection section (220) selects the drive mode shift map (240), changeover between the first mode portion (250) and the second mode portion (252) based on an acceleration history in accordance with a throttle opening.

The invention according to a second aspect of the present invention provides the shift controlling apparatus (150) according to the first aspect, wherein the shift controlling apparatus (150) includes a running state discrimination section (214) for discriminating a vehicle (12) in a running state in an acceleration running region based on a vehicle speed and the throttle opening, and the drive mode map changeover section (222) counts the number of times by which the vehicle (12) enters a running state in the acceleration running region and carries out, when a running state in the acceleration running region has entered by a predetermined number of times within a first predetermined time period, changeover from the first mode portion (250) to the second mode portion (252) of the drive mode shift map (240).

The invention according to a third aspect of the present invention provides the shift controlling apparatus (150) according to the second aspect, wherein the drive mode map changeover section (222) resets the counter number when, after the vehicle (12) enters a running state in the acceleration running region, the vehicle (12) does not enter a running state in the acceleration running region again within a fixed period of time.

The invention according to a fourth aspect of the present invention provides the shift controlling apparatus (150) according to either the second or third aspect, wherein the running state discrimination section (214) further decides, based on the vehicle speed and the throttle opening, whether or not the vehicle is in a running region of a cruise running region, and the drive mode map changeover section (222) carries out, when the vehicle (12) is in a running state in the cruise running region for a second predetermined time period after changeover to the second mode portion (252) is carried out, changeover to the first mode portion (250).

The invention according to a fifth aspect of the present invention provides the shift controlling apparatus (150) according to any one of the first to fourth aspects, wherein the mode selection section (220) selects one of the drive mode shift map (240) and the sport mode shift map (242) in response to a manual operation of a driver.

EFFECTS OF THE INVENTION

With the invention according to the first aspect, since the drive mode shift map has the first mode portion and the second mode portion, a running state over a wide range can be achieved. Particularly on a road over a mountain pass along which a corner appears successively or on a like road, when the vehicle advances to a corner, the speed thereof is decreased, but is increased when it leaves the corner, and therefore, deceleration and acceleration are repeated within a predetermined period of time. However, in such a case as just described, the second mode portion is selected. Therefore, the necessity for the driver to select the sport mode shift map is eliminated, and therefore, the convenience in use is good and driving becomes easy. Further, if big acceleration and deceleration is not carried out, then the shift map is automatically changed over to the first mode portion, and therefore, the driving operation becomes even easier. Furthermore, when an uphill on a road over a mountain pass or the like is a tight slope or in a like case, by selecting the sport mode shift map, the range of selection of the driver in accordance with a situation of the road over a mountain pass is widened. Further, when manual shifting can be carried out by a shifting operation of the driver, it is possible to combine such a situation that the rider can manually select changeover of the shift gear stage in accordance with the necessity. Therefore, the freedom and the enjoyment of the driver in each running scene are further enhanced.

With the invention according to the second aspect, entering into a running state in the acceleration running region by the predetermined number of times within the first predetermined time period can be decided when a throttle operation is carried out frequently by the driver and the driver is enjoying cornering. Therefore, by changing over the shift map to the second mode portion, racy running can be implemented.

With the invention according to the third, when, after the vehicle enters a running state in the acceleration running region, the vehicle does not enter a running state in the acceleration running region again within the fixed period of time, since it can be decided that a throttle operation is not carried out frequently by the driver and cornering running is not being carried out, the counter is reset. Consequently, changeover to the second mode portion of the drive mode shift map can be prevented.

With the invention according to the fourth aspect, if a running state in the cruise running region continues for the second predetermined time period, then it can be decided that the driver is running comfortably in the city or the like. Therefore, the shift map is changed over to the first mode portion of the drive mode shift map, and consequently, running in accordance with the will of the driver can be conveniently carried out.

With the invention according to the fifth aspect, since one of the drive mode shift map and the sport mode shift map is selected in accordance with a manual operation of the driver, when the will of the driver is recognized with certainty, the sport mode selection map can be used.

DETAILED DESCRIPTION OF MODE FOR CARRYING OUT THE INVENTION

A shift controlling apparatus according to the present invention is described in detail below in connection with a present exemplary embodiment with reference to the accompanying drawings.

Figure 1:
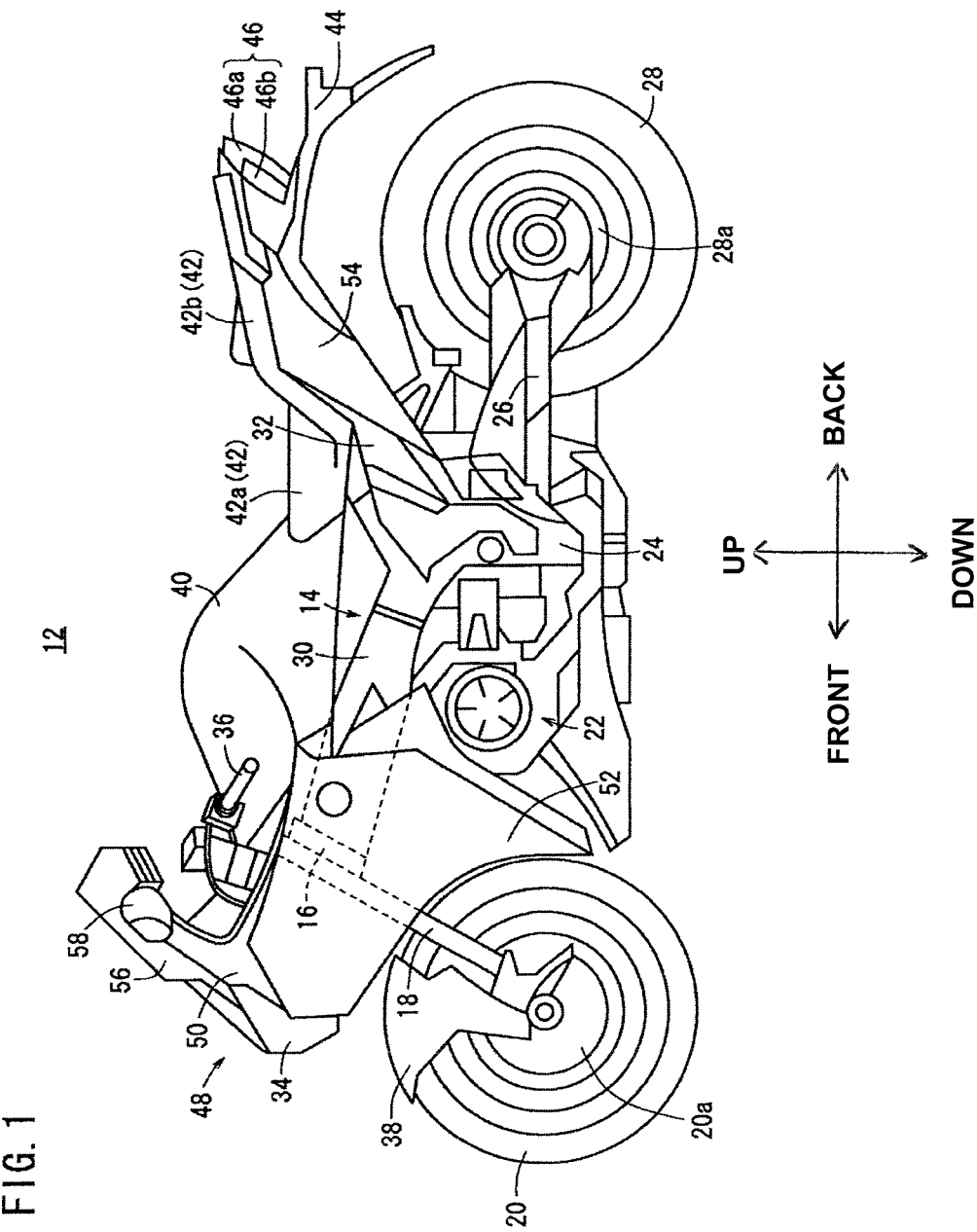
FIG. 1 is a left side elevational view of a motorcycle in which a shift controlling apparatus according to an exemplary embodiment of the present invention is incorporated.

FIG. 1 is a left side elevational view of a motorcycle (including a bicycle with a prime mover) 12 in which a shift controlling apparatus according to an exemplary embodiment of the present invention is incorporated. It is to be noted that, in order to facilitate understanding of the invention, unless otherwise specified, the forward and backward directions and the upward and downward directions are described with reference to the direction indicated by an arrow mark in FIG. 1 and the leftward and rightward directions are described with reference to a direction as viewed from a driver seated on a vehicle body.

The motorcycle (vehicle) 12 includes a vehicle body frame 14 which configures a vehicle body, a pair of left and right front forks 18 rotatively supported on a head pipe 16 provided at a front end portion of the vehicle body frame 14, a front wheel (steered wheel) 20 attached to the front forks 18, a power unit 22 supported on the vehicle body frame 14 and including an engine, which is a driving source for the motorcycle 12, and an automatic transmission, a swing arm 26 swingably supported at a pivot portion 24 at a lower portion of the vehicle body frame, and a rear wheel (drive wheel) 28 attached to a rear end portion of the swing arm 26.

The vehicle body frame 14 has a pair of main frames 30 extending obliquely downwardly from the head pipe 16, the pivot portion 24 connected to a rear portion of the main frames 30 and extending downwardly, and a pair of left and right seat frames 32 attached to a rear portion of the main frames 30 and extending obliquely rearwardly upwardly.

A headlamp 34 for irradiating light forwardly of the vehicle body is provided at a front portion of the head pipe 16. A handle bar 36 in the form of a bar which can steer the front wheel 20 is attached to an upper portion of the head pipe 16.

The front wheel 20 is rotatively supported at a lower end portion of the front forks 18, and a front wheel brake apparatus (disk brake) 20a for applying braking force to the front wheel 20 is mounted on a side face of the front wheel 20. Further, a front fender 38 for covering the front wheel 20 from above is attached to a lower end portion of the front forks 18.

The power unit 22 is supported fixedly by the main frames 30 and the pivot portion 24. The swing arm 26 extends substantially horizontally rearwardly from the pivot portion 24 and has the rear wheel 28 rotatively supported at a rear end portion of the swing arm 26. A rear wheel brake apparatus (disk brake) 28a for applying braking force to the rear wheel 28 is mounted on a side face of the rear wheel 28.

A fuel tank 40 is provided at an upper portion of the power unit 22, and a seat 42 on which a passenger is to be placed is disposed at an upper portion of the seat frames 32 rearwardly of the fuel tank 40. For the seat 42, a seat of the tandem type is adopted which is configured from a front seat 42a on which the driver is to be seated and a rear seat 42b on which a fellow passenger is to be seated rearwardly of the front seat 42a. To a rear portion of the seat frames 32, a rear fender 44 is attached which extends rearwardly and then extends obliquely downwardly from a lower side of the rear portion of the seat frames 32. A tail lamp unit 46 is attached rearwardly of the seat 42. The tail lamp unit 46 has a brake lamp 46a and rear side winker lamps 46b.

To the motorcycle 12, a vehicle body cover 48 is attached which extends in the forward and backward direction of the vehicle body and configures a design (appearance) of the vehicle body. The vehicle body cover 48 has a front cover 50 which covers the front of the vehicle body, a pair of left and right side cowls 52 extending in the rearward direction from the opposite side faces of the headlamp 34, and a rear cowl 54 extending rearwardly upwardly together with the seat frames 32 and covering the opposite side faces of the seat frames 32. A screen 56 is provided at an upper portion of the front cover 50, and front side winker lamps 58 are attached to the left and right of the front cover 50.

Figure 2:
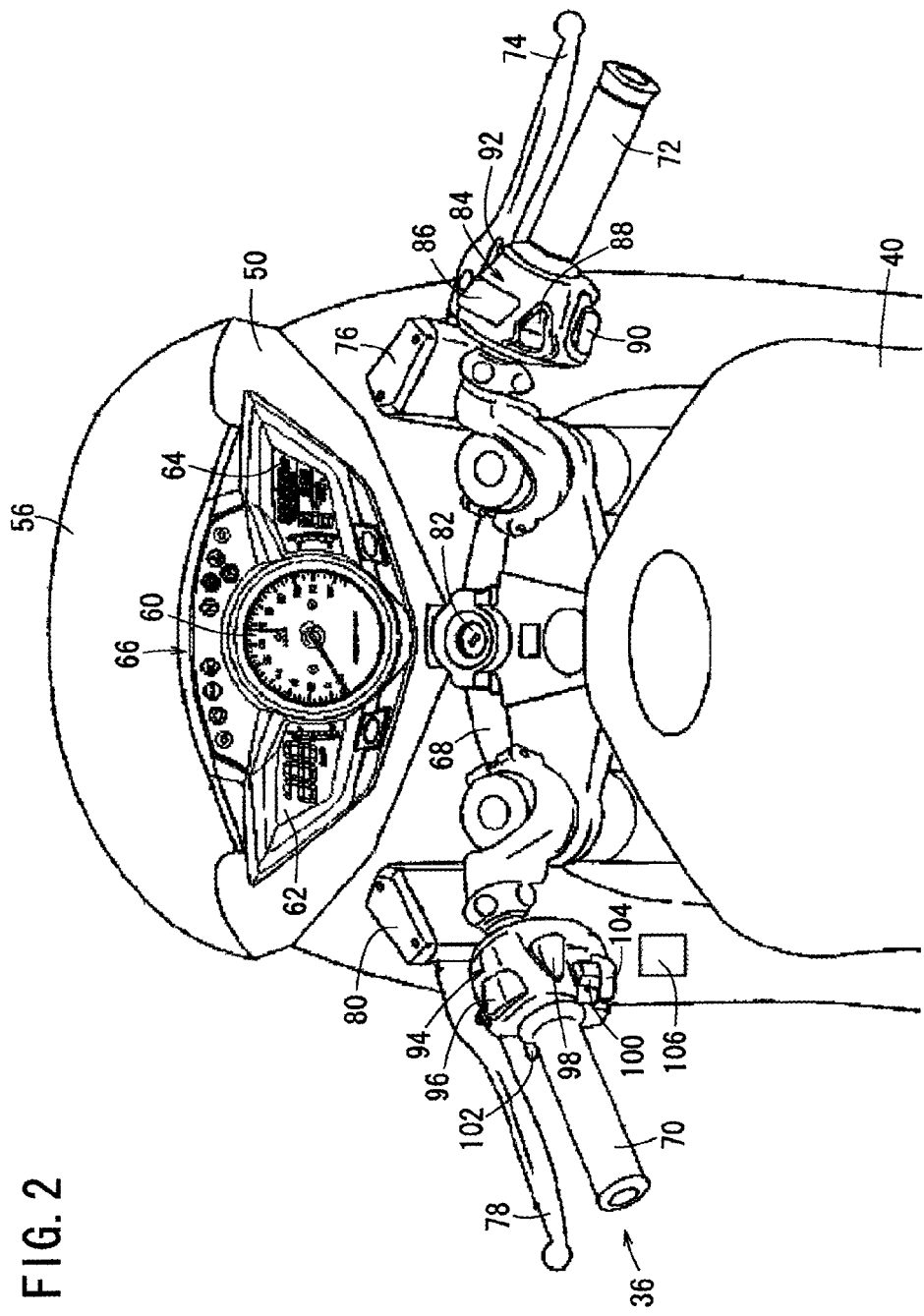
FIG. 2 is a partial enlarged view of a front portion of the motorcycle in FIG. 1 taken from the driver's seat.

FIG. 2 is a partial enlarged view of a front portion of the motorcycle 12 shown in FIG. 1 taken from the driver's seat. This view is an overhead view of a region around the steering bar as viewed from rearwardly upwardly of the vehicle body. A meter apparatus 66 having an engine tachometer (tachometer) 60, a left side liquid crystal panel 62 for displaying a vehicle speed and so forth and a right side liquid crystal panel 64 including a distance meter and so forth is attached to the front cover 50 between the screen 56 and the handle bar 36.

The handle bar 36 has a handle shaft 68 extending leftwardly and rightwardly, a left grip 70 disposed at a left end portion of the handle shaft 68, and a right grip 72 disposed at a right end portion of the handle shaft 68. The right grip 72 can turn (rotate) with respect to the handle shaft 68 and indicates an acceleration (increase of the engine speed). The right grip 72 is hereinafter referred to also as throttle grip (acceleration grip). A front wheel brake lever 74 is disposed on the front side of the vehicle body with respect to the throttle grip 72, and a reserve tank 76 for reserving working fluid of a hydraulic brake system is attached to a base portion of the front wheel brake lever 74. Similarly, a rear wheel brake lever 78 is disposed on the front side of the vehicle body with respect to the left grip 70, and a reserve tank 80 for reserving working fluid of the hydraulic brake system is attached to a base portion of the rear wheel brake lever 78. If the driver operates the front wheel brake lever 74, then the front wheel brake apparatus 20a is rendered operative to apply braking force to the front wheel 20. Further, if the driver operates the rear wheel brake lever 78, then the rear wheel brake apparatus 28a is rendered operative to apply braking force to the rear wheel 28.

A main switch 82 is provided at a substantially central portion of the handle bar 36, and a handle switch 84 including various electrical component operating switches is attached to the right side of the handle bar 36 in a neighboring relationship on the center side of the vehicle body with respect to the throttle grip 72. The handle switch 84 includes an engine stop switch 86, an ND changeover switch 88, a starter switch 90 and a running mode changeover switch 92.

The running mode changeover switch 92 is a switch for carrying out changeover between an automatic shift mode (AT mode) and a manual shift mode (MT mode). The engine stop switch 86 is a switch for urgently stopping operation of the engine. The automatic shift mode is a mode in which the shift gear stage of the automatic transmission is changed over automatically, and the manual shift mode is a mode in which the shift gear stage of the automatic transmission is changed over manually.

The ND changeover switch 88 changes over the state of the automatic transmission to a neutral "N" state and a drive "D" range state in response to depression thereof on the D side on the left or the N side on the right when the motorcycle 12 stops. If the running mode changeover switch 92 is operated when the state of the automatic transmission is in the drive range state, then changeover between the automatic shift mode and the manual shift mode is carried out. Further, if the D side of the ND changeover switch 88 is depressed further in the automatic shift mode in the drive mode, then changeover from the drive mode to the sport mode is carried out, but if the N side of the ND changeover switch 88 is depressed in the automatic shift mode in the sport mode, then changeover from the sport mode to the drive mode is carried out. The drive mode and the sport mode are kinds of the automatic shift modes, and the sport mode is an automatic shift mode which attaches more importance to driving force than that in the drive mode. The starter switch 90 is a switch for starting the engine.

On the left side of the handle bar 36, a handle switch 94 including various switches for various electrical components is attached in contact with the left grip 70 on the center side of the vehicle body. The left side handle switch 94 includes an optical axis changeover switch 96 of the headlamp 34, a horn switch 98, a winker switch 100, and a shift up switch 102 and a shift down switch 104 for manually carrying out a shifting operation of the automatic transmission in the automatic shift mode. Reference numeral 106 is a traction off switch. It is to be noted that, if one of the shift up switch 102 and the shift down switch 104 is operated in the automatic shift mode, then the shift mode is changed over to the manual shift mode.

Figure 3:
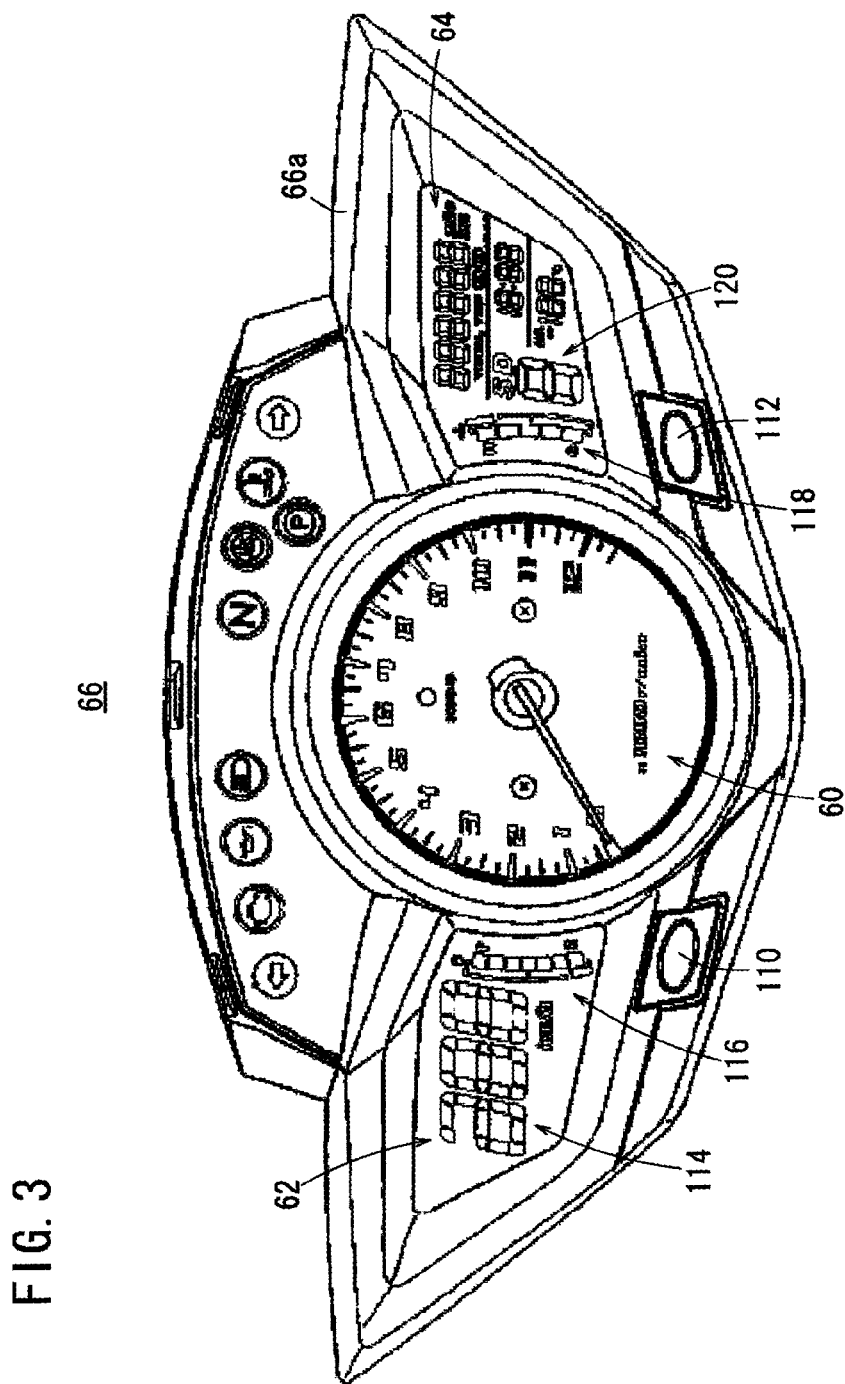
FIG. 3 is a front elevational view of an instrument panel of the motorcycle in FIG. 1.

FIG. 3 is a front elevational view of the instrument panel or meter apparatus 66. The meter apparatus 66 has the engine tachometer 60, left side liquid crystal panel 62 and right side liquid crystal panel 64 disposed on a housing 66a thereof. Below the left side liquid crystal panel 62 and the right side liquid crystal panel 64, operation switches 110 and 112 for carrying out changeover of the display, display resetting and so forth are provided.

The left side liquid crystal panel 62 includes a speedometer 114 for displaying a vehicle speed of the motorcycle 12 and a fuel gauge 116 for displaying a fuel remaining amount. On the right side liquid crystal panel 64, a plurality of displaying functions are provided in addition to a water temperature gauge 118 and a gear position display section 120 for displaying a shift gear stage at present.

Figure 4:
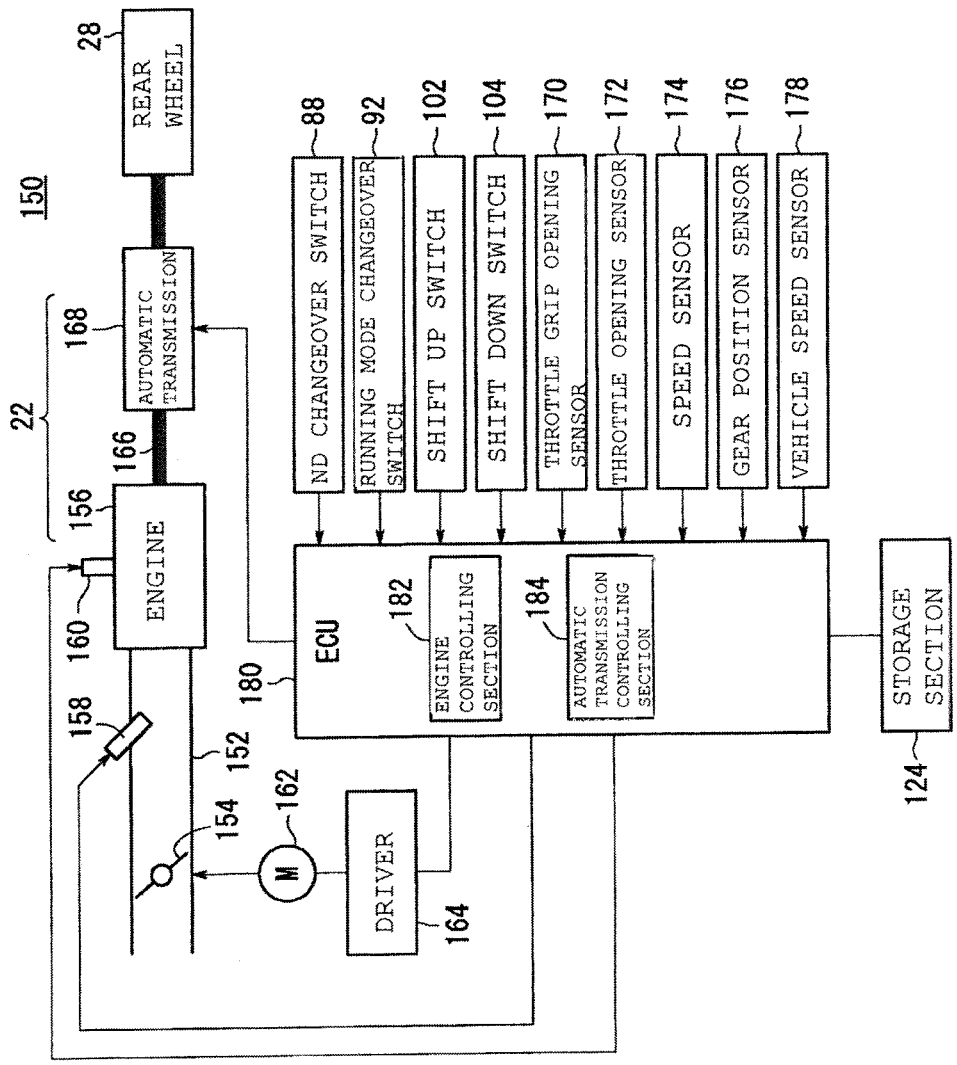
FIG. 4 is a block diagram of the exemplary embodiment of the shift controlling apparatus.

FIG. 4 is a block diagram of a shift controlling apparatus 150 according to the exemplary embodiment of the present invention. A throttle valve (intake air amount adjustment means) 154 provided in an intake pipe 152 adjusts the intake air amount to be taken into an engine 156. An injector (fuel injection apparatus) 158 for injecting fuel into air which is to flow into a combustion chamber of the engine 156 through the throttle valve 154 to produce air fuel mixture is provided for the intake pipe 152. An ignition plug (ignition apparatus) 160 for igniting air fuel mixture having flowed into the combustion chamber is provided in the engine 156. When the ignition plug 160 carries out ignition, the air mixture fuel in the combustion chamber is burnt, and the engine 156 converts the energy on the combustion into power.

A motor 162 adjusts the opening of the throttle valve 154 and is driven by a driver 164. A crankshaft 166 which is an output power shaft of the engine 156 is connected to the rear wheel 28 through an automatic transmission (speed change gear) 168. The automatic transmission 168 has a plurality of shift gear stages, and automatically changes over the shift gear stage in response to the vehicle speed and the throttle opening and transmits rotating power transmitted thereto to the rear wheel 28 changing the change gear ratio (reduction gear ratio).

The shift controlling apparatus 150 has a throttle grip opening sensor (throttle grip opening detection means) 170 for detecting the opening of the throttle grip 72, a throttle opening sensor (throttle opening detection means) 172 for detecting the opening (throttle opening) of the throttle valve 154, a speed sensor 174 for detecting the speed of rotation (engine speed) of the crankshaft 166 of the engine 156, a gear position sensor 176 for detecting the gear position (shift gear stage at present) of the automatic transmission 168, and a vehicle speed sensor (vehicle speed detection means) 178 for detecting the speed of rotation of the rear wheel 28 thereby to detect the vehicle speed of the motorcycle 12. Signals detected by the throttle grip opening sensor 170, throttle opening sensor 172, speed sensor 174, gear position sensor 176 and vehicle speed sensor 178 are sent to an ECU (control section) 180. Also operation signals of the ND changeover switch 88, running mode changeover switch 92, shift up switch 102 and shift down switch 104 are sent to the ECU 180. The various sensors described above detect in a fixed period.

The ECU 180 has an engine controlling section 182 for controlling driving of the engine 156, and an automatic transmission controlling section 184 for controlling driving of the automatic transmission 168. A storage section 124 is a storage medium for storing a program, data and so forth. The ECU 180 has a memory, a CPU (computer) and so forth, and the CPU functions as the ECU 180 in the present embodiment by reading in the program stored in the storage section 124.

The engine controlling section 182 adjusts the throttle opening in response to the opening of the throttle grip 72 detected by the throttle grip opening sensor 170, and controls the fuel ignition amount and the injection timing of the injector 158 and the ignition timing of the ignition plug 160 based on the throttle opening (or the opening of the throttle grip 72), the vehicle speed detected by the vehicle speed sensor 178 and so forth to control the engine speed.

The automatic transmission controlling section 184 controls driving of the automatic transmission 168 based on a plurality of shift maps stored in the storage section 124.

Figure 5:
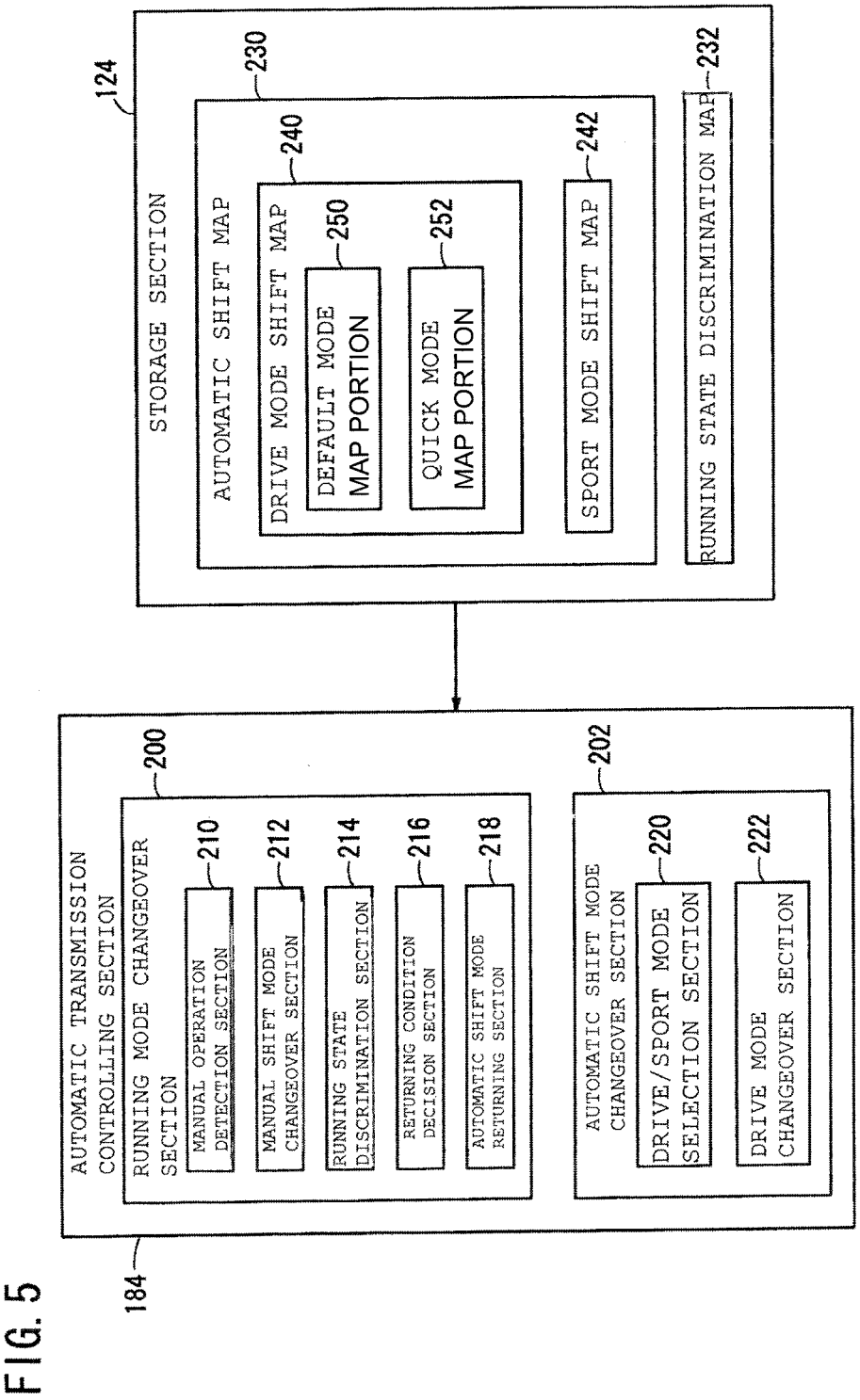
FIG. 5 is a functional block diagram of an automatic transmission controlling section and a storage section of the exemplary embodiment.

FIG. 5 is a functional block diagram showing a configuration of the automatic transmission controlling section 184 and the storage section 124. The automatic transmission controlling section 184 has a running mode changeover section 200 and an automatic shift mode changeover section 202. The running mode changeover section (automatic shift mode returning means) 200 has a manual operation detection section 210, a manual shift mode changeover section 212, a running state discrimination section 214, a returning condition decision section 216 and an automatic shift mode returning section 218. The automatic shift mode changeover section 202 has a drive/sport mode selection section 220 and a drive mode changeover section 222.

The storage section 124 has an automatic shift map 230 and a running state discrimination map 232. The automatic shift map 230 has a drive mode shift map 240 and a sport mode shift map 242, and the drive mode shift map 240 further has a default mode shift map (first mode portion) 250 and a quick mode shift map (second mode portion) 252.

Figure 6:
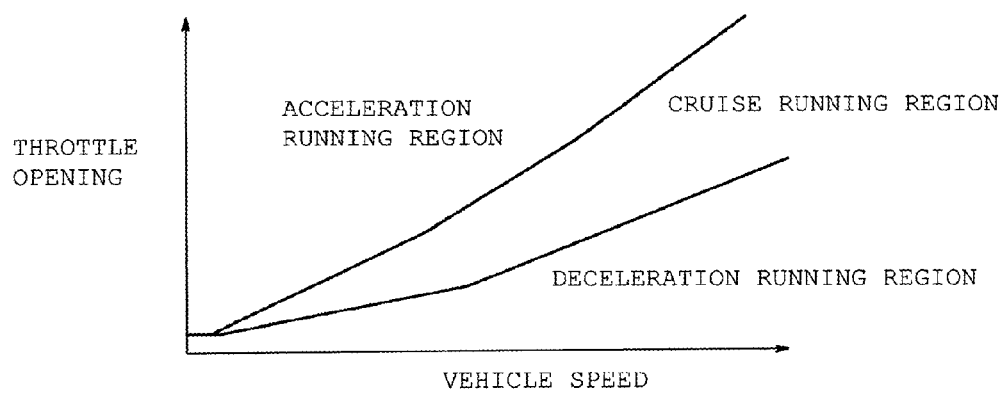
FIG. 6 is a view illustrating a running state discrimination map of the exemplary embodiment.

FIG. 6 is a view illustrating the running state discrimination map 232. As seen in FIG. 6, the running state discrimination map 232 is partitioned into an acceleration running region, a cruise running region and a deceleration running region in accordance with the throttle opening and the vehicle speed. Accordingly, by using the running state discrimination map 232, it is possible to decide to which one of the acceleration running region, cruise running region and deceleration running region the running state of the motorcycle 12 belongs from the throttle opening and the vehicle speed at present.

Figure 7:
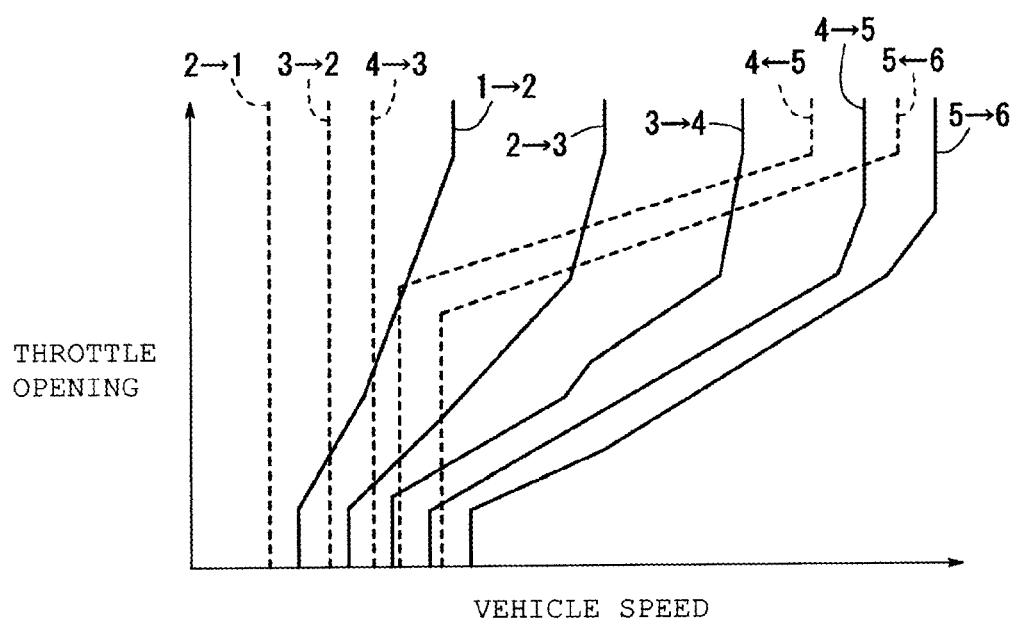
FIG. 7 is a view showing a default mode shift map of the exemplary embodiment.

FIG. 7 is a view illustrating the default mode shift map 250, in which a vehicle speed timing of the automatic transmission 168 is set in response to the throttle opening and the vehicle speed.

Solid lines in FIG. 7 indicate shift timings at which the shift gear stage changes over to the higher speed side, and broken lines indicate shift timings at which the shift gear stage changes over to the lower speed side. As seen in FIG. 7, as the shift timings at which the shift gear stage changes over to the higher speed side, a shift timing at which the shift gear stage changes over from the shift gear stage of the first speed to the shift gear stage of the second speed, a shift timing at which the shift gear stage changes over from the shift gear stage of the second speed to the shift gear stage of the third speed, a shift timing at which the shift gear stage changes over from the shift gear stage of the third speed to the shift gear stage of the fourth speed, a shift timing at which the shift gear stage changes over from the shift gear stage of the fourth speed to the shift gear stage of the fifth speed, and a shift timing at which the shift gear stage changes over from the shift gear stage of the fifth speed to the shift gear stage of the sixth speed are set.

Further, as the shift timings at which the shift gear stage changes over to the lower speed side, a shift timing at which the shift gear stage changes over from the shift gear stage of the sixth speed to the shift gear stage of the fifth stage, a shift timing at which the shift gear stage changes over from the shift gear stage of the fifth speed to the shift gear stage of the fourth speed, a shift timing at which the shift gear stage changes over from the shift gear stage of the fourth speed to the shift gear stage of the third speed, a shift timing at which the shift gear stage changes over from the shift gear stage of the third speed to the shift gear stage of the second speed, and a shift timing at which the shift gear stage changes over from the shift gear stage of the second speed to the shift gear stage of the first speed are set.

The automatic transmission controlling section 184 uses, when the automatic shift mode is the default mode (first mode portion), the default mode shift map 250 to control driving of the automatic transmission 168 to automatically change over the shift gear stage.

Figure 8:
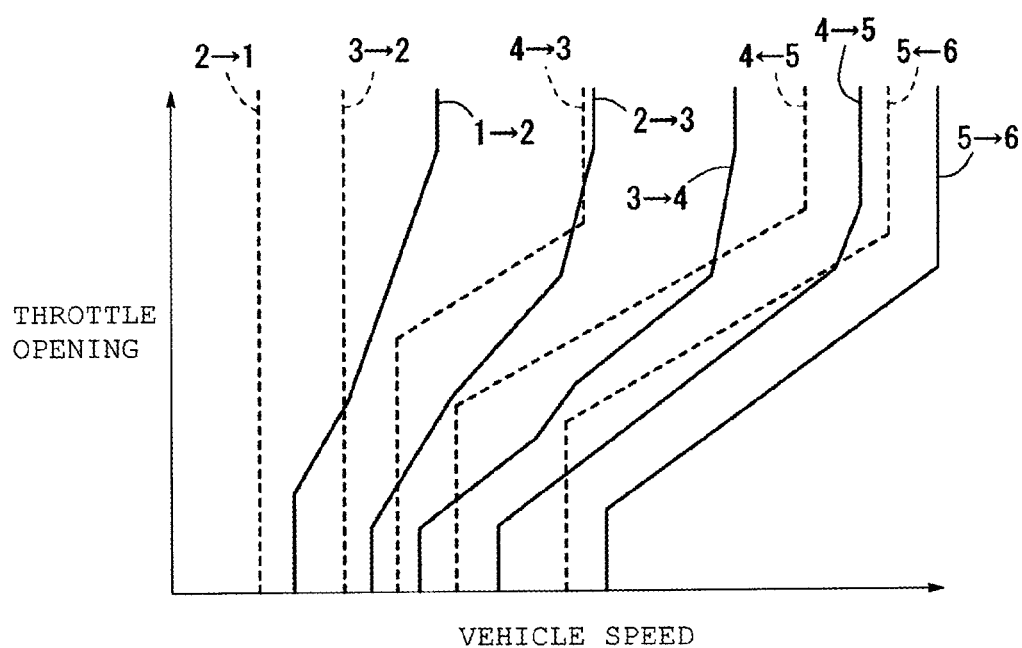
FIG. 8 is a view showing a quick mode shift map of the exemplary embodiment.

FIG. 8 is a view illustrating the quick mode shift map 252, in which the shift timing of the automatic transmission 168 is set in accordance with the throttle opening and the vehicle speed similarly as in the default mode shift map 250 illustrated in FIG. 7. Solid lines in FIG. 8 indicate shift timings at which the shift gear stage is changed over to the higher speed side, and broken lines indicate shift timings at which the shift gear stage changes over to the lower speed side.

The quick mode shift map 252 is a shift map which attaches importance to the driving force in comparison with the default mode shift map 250. In the quick mode shift map 252, a region in which the change gear ratio is low is greater than that in the default mode shift map 250 as hereinafter described, and consequently, at least the shift timing at which the shift gear stage changes over to the higher speed side is delayed from that in the default mode shift map 250.

More particularly, in the quick mode shift map 252, the shift timing at which the shift gear stage is changed over to the higher speed side based on the vehicle speed is set so as to be later than that in the default mode shift map 250. In particular, the vehicle speeds at the shift timing at which the shift gear stage changes over from the first speed to the second speed, from the second speed to the third speed, from the third speed to the fourth speed, from the fourth speed to the fifth speed and from the fifth speed to the sixth speed are set higher in the quick mode shift map 252 than in the default mode shift map 250. Accordingly, even if the motorcycle 12 runs at a vehicle speed of a shift timing at which the shift gear stage changes over to the higher speed side (for example, from the third speed to the fourth speed) in the default mode shift map 250, the shift gear stage does not change over to the higher speed side (for example, from the third speed to the fourth speed) in the quick mode shift map 252, but after a higher vehicle speed than the vehicle speed just mentioned is reached, the shift gear stage changes over to the higher speed side (for example, from the third speed to the fourth speed). Therefore, the shift timing becomes later than that in the default mode shift map 250.

The automatic transmission controlling section 184 uses, when the automatic shift mode is the quick mode (second mode portion), the quick mode shift map 252 to control driving of the automatic transmission 168 to automatically change over the shift gear stage.

Figure 9:
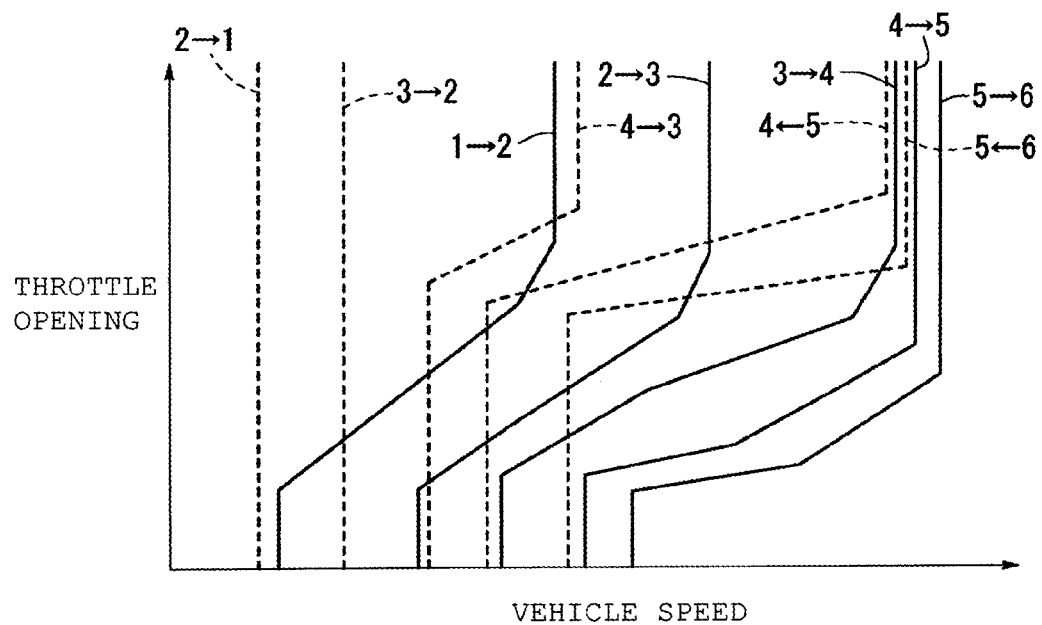
FIG. 9 is a view showing a sport mode shift map of the exemplary embodiment.

FIG. 9 is a view illustrating the sport mode shift map 242, in which the shift timing of the automatic transmission 168 is set in accordance with the throttle opening and the vehicle speed similarly as in the default mode shift map 250 in FIG. 7 and the quick mode shift map 252 illustrated in FIG. 8. Solid lines in FIG. 9 indicate shift timings at which the shift gear stage changes over to the higher speed side, and broken lines indicate shift timings at which the shift gear stage changes over to the lower speed side.

The sport mode shift map 242 is a shift map corresponding to sporty running which attaches importance to the driving force in comparison with the quick mode shift map 252. In the sport mode shift map 242, the region in which the change gear ratio is low is greater than that in the quick mode shift map 252 as hereinafter described. Consequently, at least the shift timing at which the shift gear stage changes over to the higher speed side is delayed from that in the quick mode shift map 252.

More particularly, in the sport mode shift map 242, the shift timing at which the shift gear stage is changed over to the higher speed side based on the vehicle speed is set so as to be later than that in the default mode shift map 250. In particular, the vehicle speeds at the shift timing at which the shift gear stage changes over from the first speed to the second speed, from the second speed to the third speed, from the third speed to the fourth speed, from the fourth speed to the fifth speed and from the fifth speed to the sixth speed are set higher in the sport mode shift map 242 than in the quick mode shift map 252. Accordingly, even if the motorcycle 12 runs at a vehicle speed of a shift timing at which the shift gear stage changes over to the higher speed side (for example, from the third speed to the fourth speed) in the quick mode shift map 252, the shift gear stage does not change over to the higher speed side (for example, from the third speed to the fourth speed) in the sport mode shift map 242, but after a higher vehicle speed than the vehicle speed just mentioned is reached, the shift gear stage changes over to the higher speed side (for example, from the third speed to the fourth speed). Therefore, the shift timing becomes later than that in the sport mode shift map 242.

The automatic transmission controlling section 184 uses, when the automatic shift mode is the sport mode, the sport mode shift map 242 to control driving of the automatic transmission 168 to automatically change over the shift gear stage.

Figure 10:
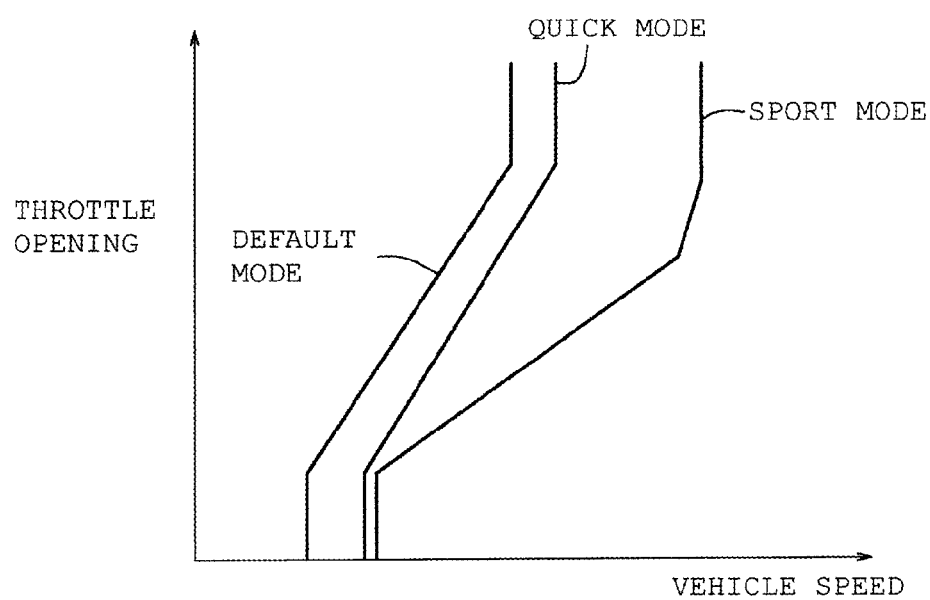
FIG. 10 is a view illustrating a shift timing upon shifting from the first speed to the second speed of the default mode shift map, quick mode shift map, and sport mode shift map.

FIG. 10 is a view illustrating shift timings at which the shift gear stage changes over from the first speed to the second speed in the default mode shift map 250, quick mode shift map 252 and sport mode shift map 242. As seen in FIG. 10, the quick mode shift map 252 has an increased region in which the change gear ratio is low compared to the default mode shift map 250, and the sport mode shift map 242 has an increased region in which the change gear ratio is low compared to the quick mode shift map 252. It is to be noted that, while, in FIG. 10, the shift timings at which the shift gear stage changes over from the first stage to the second stage in the default mode shift map 250, quick mode shift map 252 and sport mode shift map 242 are taken as an example, the foregoing applies similarly also to the speed changes from the second speed to the third speed, from the third speed to the fourth speed, from the fourth speed to the fifth speed and from the fifth speed to the sixth speed.

Referring back to the description of FIG. 5, the automatic transmission controlling section 184 changes over the state of the automatic transmission 168 between the neutral state and the drive range state in response to an operation of the ND changeover switch 88.

The manual operation detection section (manual operation detection means) 210 of the running mode changeover section 200 detects whether or not the shift up switch 102 or the shift down switch 104 is operated by the driver (whether or not a manual shifting operation for shift up or shift down is carried out). More particularly, if an operation signal is sent from the shift up switch 102 or the shift down switch 104, then the manual operation detection section 210 detects that the shift up switch 102 or the shift down switch 104 is operated.

The manual shift mode changeover section 212 of the running mode changeover section 200 changes over the shift mode from the automatic shift mode to the manual shift mode if one of the running mode changeover switch 92, shift up switch 102 and shift down switch 104 is operated while the automatic transmission 168 is in the drive range stage and the automatic shift mode of the sport mode or the drive mode is set. If the manual shift mode is set, then the automatic transmission controlling section 184 changes over the shift gear stage of the automatic transmission 168 in response to an operation of the shift up switch 102 or the shift down switch 104 by the driver. Accordingly, if the manual shift mode is set, the shift gear stage is not automatically changed over.

The running speed discrimination section (first running state discrimination means/section, second running state discrimination means/section, running state discrimination means/section) 214 of the running mode changeover section 200 discriminates, from the throttle opening and the vehicle speed when one of the shift up switch 102 and the shift down switch 104 is operated (when one of a manual shifting operation for shift up and a manual shifting operation for shift down is carried out), the running state of the motorcycle 12 when the manual operation is carried out using the running state discrimination map 232. Further, the running state discrimination section 214 uses the running state discrimination map 232 to discriminate, from the throttle opening and the vehicle speed after one of the shift up switch 102 and the shift down switch 104 is operated, the running state of the motorcycle 12 after the manual operation.

For example, if the throttle opening and the vehicle speed when the shift up switch 102 or the shift down switch 104 is operated is within the acceleration running region of the running state discrimination map 232, then it is decided that the running state of the motorcycle 12 belongs to the acceleration running region. It is to be noted that, if the shift up switch 102 or the shift down switch 104 is operated to change over the shift mode to the manual shift mode, then the running state discrimination section 214 discriminates the running state of the motorcycle 12, but if the running mode changeover switch 92 is operated to change over the shift mode to the manual shift mode, the running state discrimination section 214 does not discriminate the running state of the motorcycle 12.

The returning condition decision section (returning condition decision means) 216 of the running mode changeover section 200 decides, from an operation of the shift up switch 102 or the shift down switch 104 and the running state at or after a manual shifting operation discriminated by the running state discrimination section 214, whether or not an automatic returning condition to the automatic shift mode is satisfied. It is to be noted that, when the shift up switch 102 or the shift down switch 104 is operated to change over the shift mode to the manual shift mode, the returning condition decision section 216 decides whether or not the automatic returning condition is satisfied, but if the running mode changeover switch 92 is operated to change over the shift mode to the manual shift mode, the returning condition decision section 216 does not decide whether or not the automatic returning condition is satisfied.

The automatic shift mode returning section 218 of the running mode changeover section 200 automatically returns the shift mode from the manual shift mode to the automatic shift mode if it is decided by the returning condition decision section 216 that the automatic returning condition is satisfied. At this time, the automatic shift mode returning section 218 returns the shift mode to the automatic shift mode of the drive mode when the automatic shift mode before the change over to the manual shift mode is the drive mode, but automatically returns the shift mode to the automatic shift mode of the sport mode when the automatic shift mode before the changeover to the manual shift mode is the sport mode. In other words, the shift mode is automatically returned to the automatic shift mode same as that in the preceding operation cycle. Further, if the running mode changeover switch 92 is operated while the shift mode is set to the manual shift mode, the automatic shift mode returning section 218 changes over the shift mode from the manual shift mode to the automatic shift mode. If the shift mode automatically returns to the automatic shift mode, then the automatic transmission controlling section 184 changes over the shift gear stage of the automatic transmission 168 based on the automatic shift map 230 (one of the drive mode shift map 240 and the sport mode shift map 242).

The drive/sport mode selection section (mode selection means) 220 of the automatic shift mode changeover section 202 selects one of the automatic shift mode of the drive mode and the automatic shift mode of the sport mode in response to an operation of the ND changeover switch 88. By selecting the drive mode shift map 240, the drive/sport mode selection section 220 selects the automatic shift mode of the drive mode, but by selecting the sport mode shift map 242, the drive/sport mode selection section 220 selects the automatic shift mode of the sport mode. The automatic transmission controlling section 184 automatically changes over the shift gear stage of the automatic transmission 168 based on the drive mode shift map 240 if the automatic shift mode of the drive mode is selected by the drive/sport mode selection section 220, but automatically changes over the shift gear stage of the automatic transmission 168 based on the sport mode shift map 242 if the automatic shift mode of the sport mode is selected by the drive/sport mode selection section 220.

The drive mode changeover section (drive mode map changeover means) 222 of the automatic shift mode changeover section 202 carries out changeover between the default mode and the quick mode when the automatic shift mode of the drive mode is selected by the drive/sport mode selection section 220. As a rule, when the automatic shift mode of the drive mode is selected, the default mode is used, and the drive mode changeover section 222 carries out changeover between the default mode and the quick mode based on an acceleration history based on the throttle opening.

The drive mode changeover section 222 changes over the selection of the default mode shift map 250 or the quick mode shift map 252 to carry out changeover between the default mode and the quick mode. In particular, the drive mode changeover section 222 establishes the quick mode by selecting the quick mode shift map 252, but establishes the default mode by selecting the default mode shift map 250.

Figure 11:
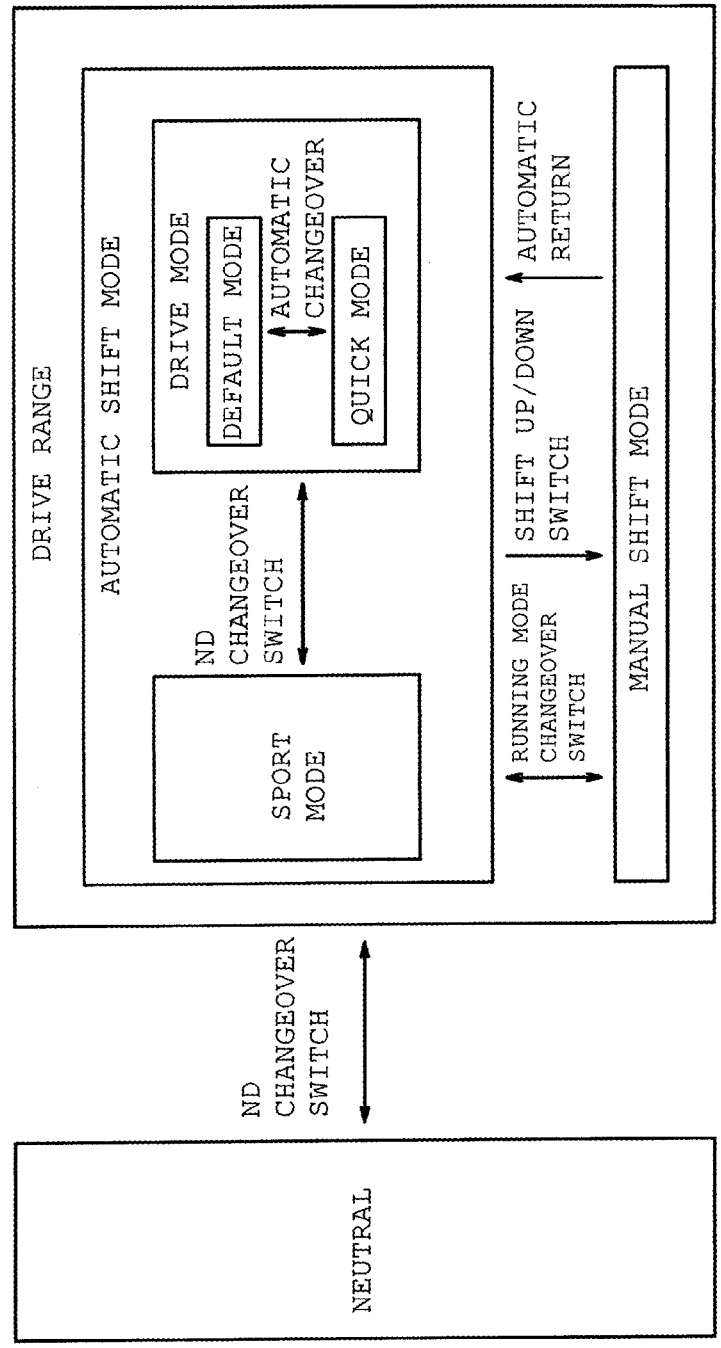
FIG. 11 is a block diagram illustrating changeover between an automatic shift mode and a manual shift mode, between the automatic shift mode of a drive mode and the automatic shift mode of a sport mode, and between a default mode and a quick mode of the exemplary embodiment.

FIG. 11 is a conceptive view illustrating changeover between the automatic shift mode and the manual shift mode, changeover between the automatic shift mode of the drive mode and the automatic shift mode of the sport mode and changeover between the default mode and the quick mode in the present embodiment.

The neutral range and the drive range are changed over therebetween by the ND changeover switch 88. Then, when the state of the automatic transmission 168 is the drive range state, the running mode changeover section 200 carries out changeover between the automatic shift mode and the manual shift mode in response to an operation of the running mode changeover switch 92. Further, if, in the automatic shift mode, one of the shift up switch 102 and the shift down switch 104 is operated, then the manual shift mode changeover section 212 of the running mode changeover section 200 changes over the shift mode to the manual shift mode. After the shift mode is changed over to the manual shift mode by the shift up switch 102 or the shift down switch 104, if the automatic returning condition is satisfied, then the automatic shift mode returning section 218 automatically returns (changes over the shift mode) to the automatic shift mode. In response to an operation of the ND changeover switch 88, the drive/sport mode selection section 220 of the automatic shift mode changeover section 202 changes over the shift mode to the automatic shift mode of the drive mode and the automatic shift mode of the sport mode by selecting the same. When the shift mode is the automatic shift mode of the drive mode, the default mode is established in principle, and the drive mode changeover section 222 automatically carries out changeover between the default mode and the quick mode based on an acceleration history based on the throttle opening.

Figure 18:
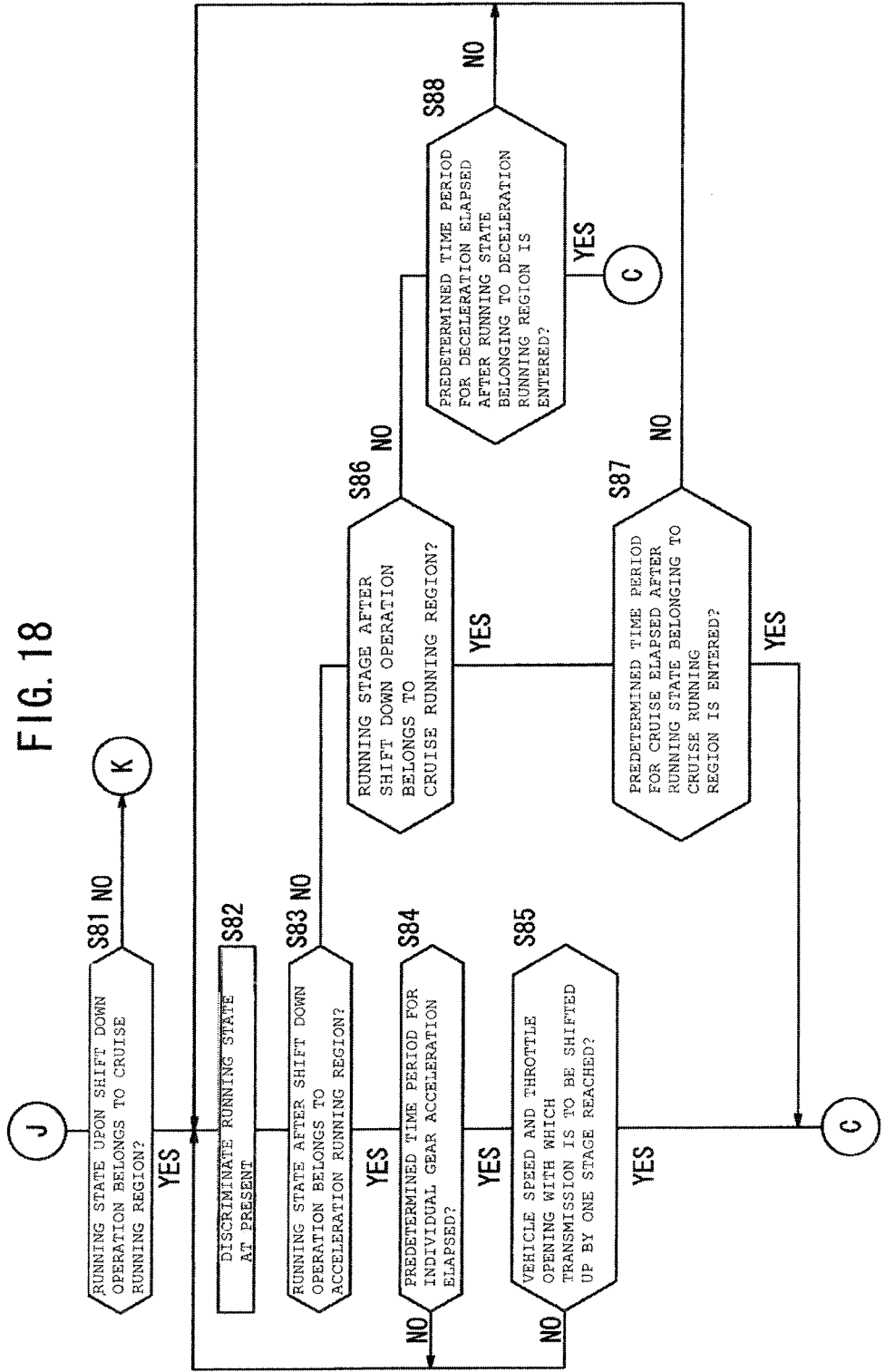
Figure 19:
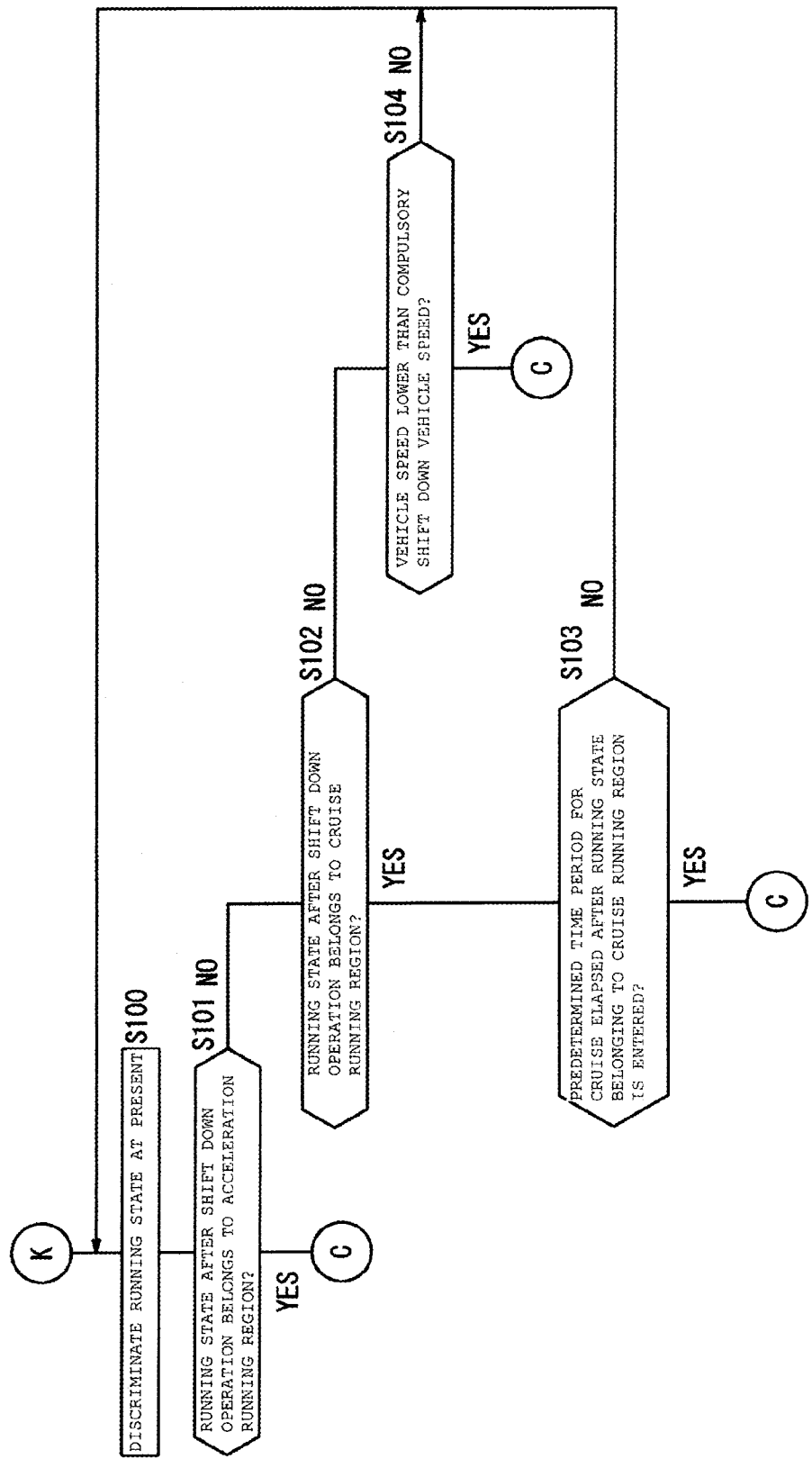
Figure 20:
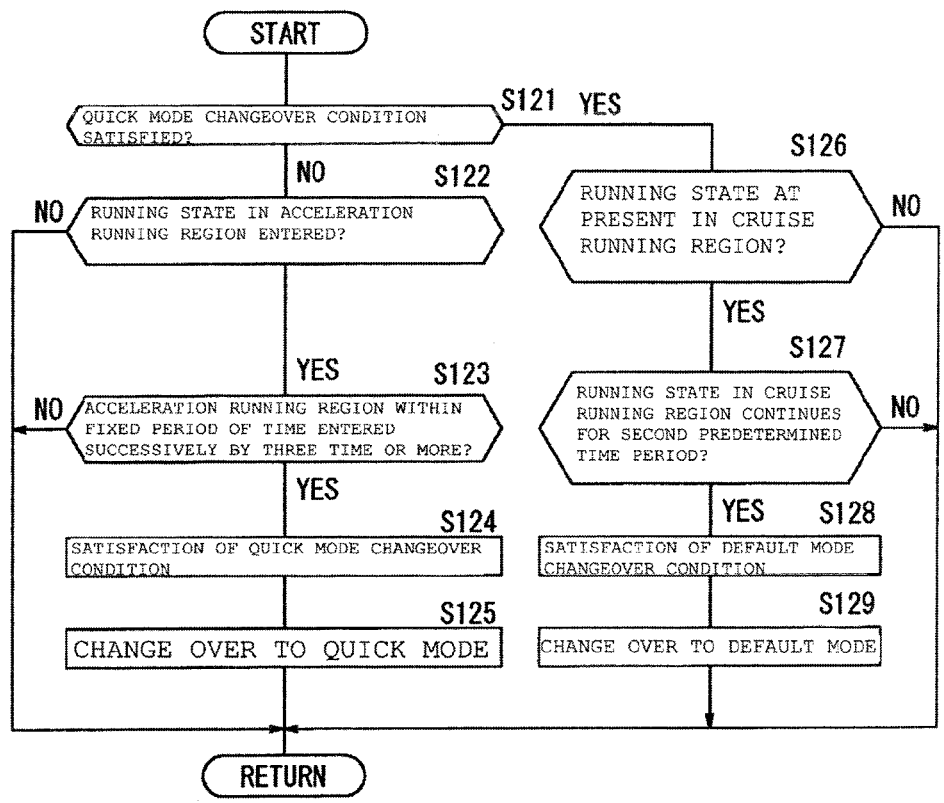
FIG. 20 is a flow chart illustrating changeover operation between the default mode and the quick mode in the exemplary embodiment.

Now, operation of the shift controlling apparatus 150 is described in accordance with flow charts shown in FIGS. 12 to 20. FIGS. 12 to 19 represent automatic returning operation from the manual shift mode to the automatic shift mode, and FIG. 20 is a flow chart illustrating changeover operation between the default mode and the quick mode.

Figure 21:
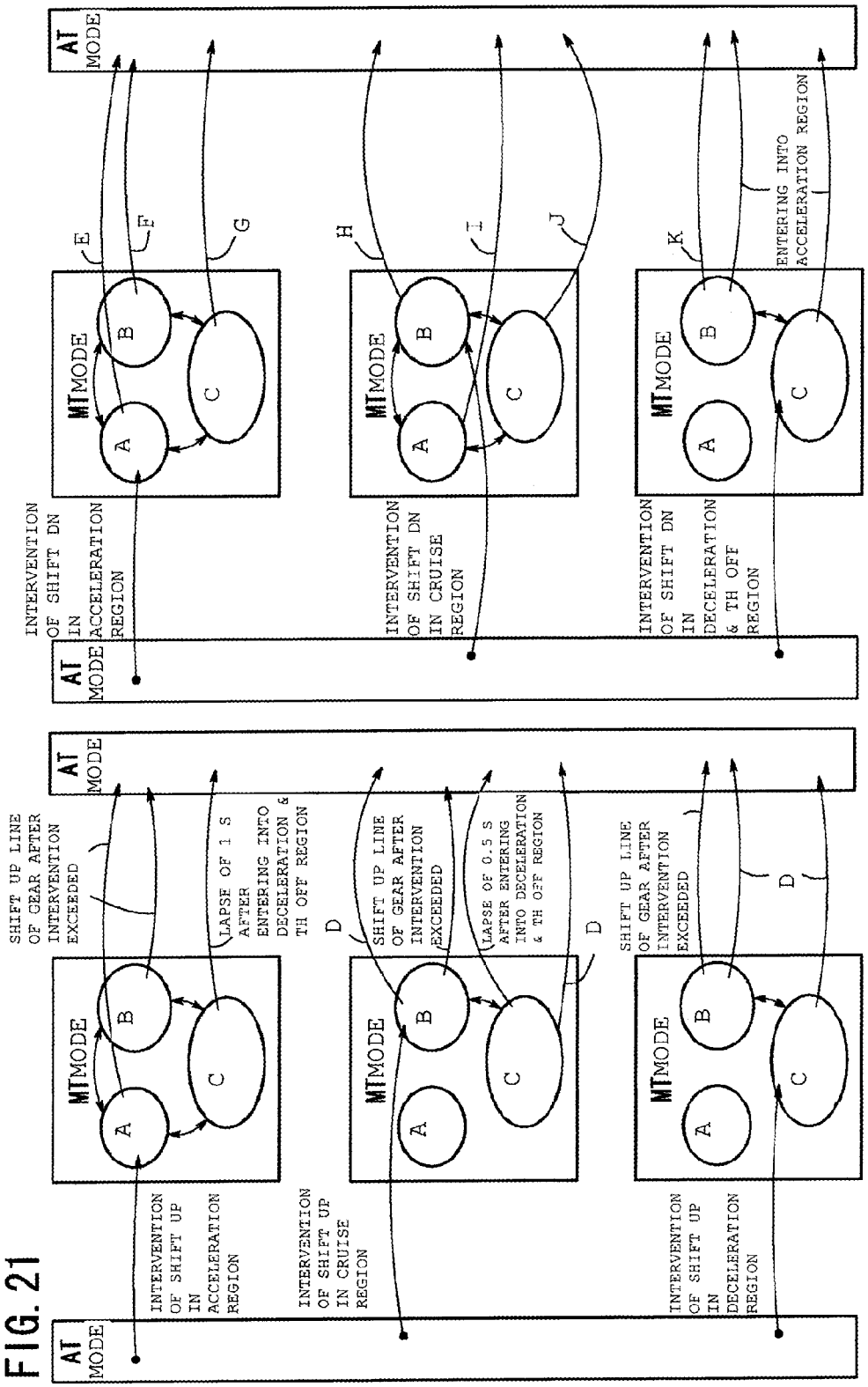
FIG. 21 is a running mode transition diagram illustrating an example of a transition of a running mode of a motorcycle in the exemplary embodiment.

First, operation of automatic return to the automatic shift mode is described with reference to the flow charts of FIGS. 12 to 19 and the running mode transition diagram of FIG. 21 illustrating an example of transition of the running mode is described. When the motorcycle 12 is being driven in the automatic shift mode, the manual operation detection section 210 decides whether or not the shift up switch 102 is operated by the driver (step S1).

If it is decided at step S1 that the shift up switch 102 is operated (that a shift up operation is carried out), then the manual shift mode changeover section 212 changes over the shift mode from the automatic shift mode to the manual shift mode (step S2). After the shift mode is changed over to the manual shift mode, the automatic transmission controlling section 184 changes over the shift gear stage of the automatic transmission 168 in response to the operation of the shift up switch 102 or the shift down switch 104. Here, since the operation of the shift up switch 102 is detected and the shift mode has been changed over to the manual shift mode at step S1, the automatic transmission controlling section 184 controls the automatic transmission 168 to shift up the shift gear stage by one stage in response to the operation of the shift up switch 102 detected at step S1.

Then, the running state discrimination section 214 discriminates the running state of the motorcycle 12 upon the shift up operation (upon the manual operation for shift up) (step S3). The running state discrimination section 214 uses the running state discrimination map 232 to decide the running state of the motorcycle 12 upon the shift up operation from the throttle opening and the vehicle speed upon the shift up operation. This throttle opening is detected by the throttle opening sensor 172, and the vehicle speed is detected by the vehicle speed sensor 178.

Then, the returning condition decision section 216 decides whether or not the running state of the motorcycle 12 upon the shift up operation belongs to the acceleration running region (step S4). In other words, the returning condition decision section 216 decides whether or not the throttle opening and the vehicle speed upon the shift up operation are included in the acceleration running region. In particular, the returning condition decision section 216 decides whether or not the running state of the motorcycle 12 decided at step S3 is a running state in the acceleration running region.

If it is decided at step S4 that the running state of the motorcycle 12 upon the shift up operation is a running state which belongs to the acceleration running region, then the running state discrimination section 214 uses the running state discrimination map 232 to decide the running state of the motorcycle 12 at present (step S5). In other words, the running state discrimination section 214 decides the running state of the motorcycle 12 at present from the throttle opening and the vehicle speed at present.

Then, the returning condition decision section 216 decides whether or not the running state of the motorcycle 12 after the shift up operation is a running state which belongs to the acceleration running region (step S6). In other words, the returning condition decision section 216 decides whether or not the throttle opening and the vehicle speed at present are included in the acceleration running region of the running state discrimination map 232. In particular, the returning condition decision section 216 decides whether or not the running state of the motorcycle 12 decided latest at step S5 is a running state in the acceleration running region.

If it is decided at step S6 that the running state of the motorcycle 12 after the shift up operation is a running state which belongs to the acceleration running region, then the returning condition decision section 216 decides whether or not the running state after the shift up operation is displaced once from the running state in the acceleration running region (step S7). In particular, if the running state of the motorcycle 12 after the shift up operation decided in the preceding cycle does not belong to the acceleration running region, then the returning condition decision section 216 decides that the running state of the motorcycle 12 is displaced once from the running state in the acceleration running region.

If it is decided at step S7 that the running state of the motorcycle 12 after the shift up operation is not displaced from the running state in the acceleration running region but is a running state continuously belonging to the acceleration running region, then the returning condition decision section 216 decides whether or not the vehicle speed and the throttle opening at present reach a vehicle speed and a throttle opening (shift timing) with which the automatic transmission 168 is to be shifted up based on the automatic shift map 230 (step S8).

As the automatic shift map 230 to be used in the decision at step S8, the automatic shift map 230 used in the automatic shift mode in the preceding operation cycle is used. For example, if the automatic shift mode in the preceding operation cycle is the automatic shift mode of the sport mode, then the sport mode shift map 242 is used, but if the automatic shift mode in the preceding operation cycle is the automatic shift mode of the drive mode, the drive mode shift map 240 is used. At this time, if the automatic shift mode in the preceding operation cycle is the automatic shift mode of the drive mode and is the default mode, then the default mode shift map 250 is used, but in the case of the quick mode, the quick mode shift map 252 is used.

If it is decided at step S8 that the vehicle speed and the throttle opening at present do not reach the vehicle speed and the throttle opening with which the automatic transmission 168 is to be shifted up based on the automatic shift map 230, then the processing returns to step S5.

On the other hand, if it is decided at step S7 that the running state of the motorcycle 12 after the shift up operation is displaced once from the acceleration running region, then the processing advances to step S9, at which the automatic shift mode returning section 218 automatically returns the shift mode to the automatic shift mode. After the shift mode returns to the automatic shift mode, the automatic transmission controlling section 184 changes over the shift gear stage of the automatic transmission 168 based on the automatic shift map 230.

In particular, if the running state upon the shift up operation is a running state in the acceleration running region and, after another running state which belongs to the cruise running region or the deceleration running region is entered after the shift up operation, a further running state which belongs to the acceleration running region is entered, then the returning condition decision section 216 decides that the automatic returning condition is satisfied. Thus, the automatic shift mode returning section 218 automatically returns the shift mode to the automatic shift mode.

If the running state upon the shift up operation is a running state in the acceleration running region and, after the running state of the motorcycle 12 is displaced once from a running state in the acceleration running region, a running state in the acceleration running region is entered, then since it is considered that the driver wants to carry out kick down, the shift mode is automatically returned to the automatic shift mode. Consequently, the automatic transmission controlling section 184 is permitted to execute kick down based on the automatic shift map 230 and can immediately satisfy an acceleration request of the driver.

On the other hand, if it is decided at step S8 that the vehicle speed and the throttle opening at present reach the vehicle speed and the throttle opening with which the automatic transmission 168 is to be shifted up based on the automatic shift map 230, then the processing returns to step S9, at which the automatic shift mode returning section 218 automatically returns the shift mode to the automatic shift mode. Since the vehicle speed and the throttle opening reach the vehicle speed and the throttle opening with which the automatic transmission 168 is to be shifted up based on the automatic shift map 230, after the shift mode returns to the automatic shift mode, the automatic transmission controlling section 184 controls the automatic transmission 168 to shift up the shift gear stage.

In particular, if the running state of the motorcycle 12 upon the shift up operation is a running state in the acceleration running region and, while the running state in the acceleration region continues also after the shift up operation, the vehicle speed and the throttle opening at present reach the vehicle speed and the throttle opening with which the automatic transmission 168 is to be shifted up based on the automatic shift map 230, then the returning condition decision section 216 decides that the automatic returning condition is satisfied. Thus, the automatic shift mode returning section 218 automatically returns the shift mode to the automatic shift mode.

If the running state of the motorcycle 12 upon the shift up operation is a running state in the acceleration running region and the running state in the acceleration running region continues after the shift up operation, it is considered that a driver wants to accelerate moderately, so that the shift mode does not return to the automatic shift mode until the vehicle speed and the throttle opening at present become equal to the vehicle speed and the throttle opening with which shift up is to be carried out. Therefore, kick down is not executed, and while moderate acceleration is implemented, the automatic shift mode can be returned.

Figure 13:
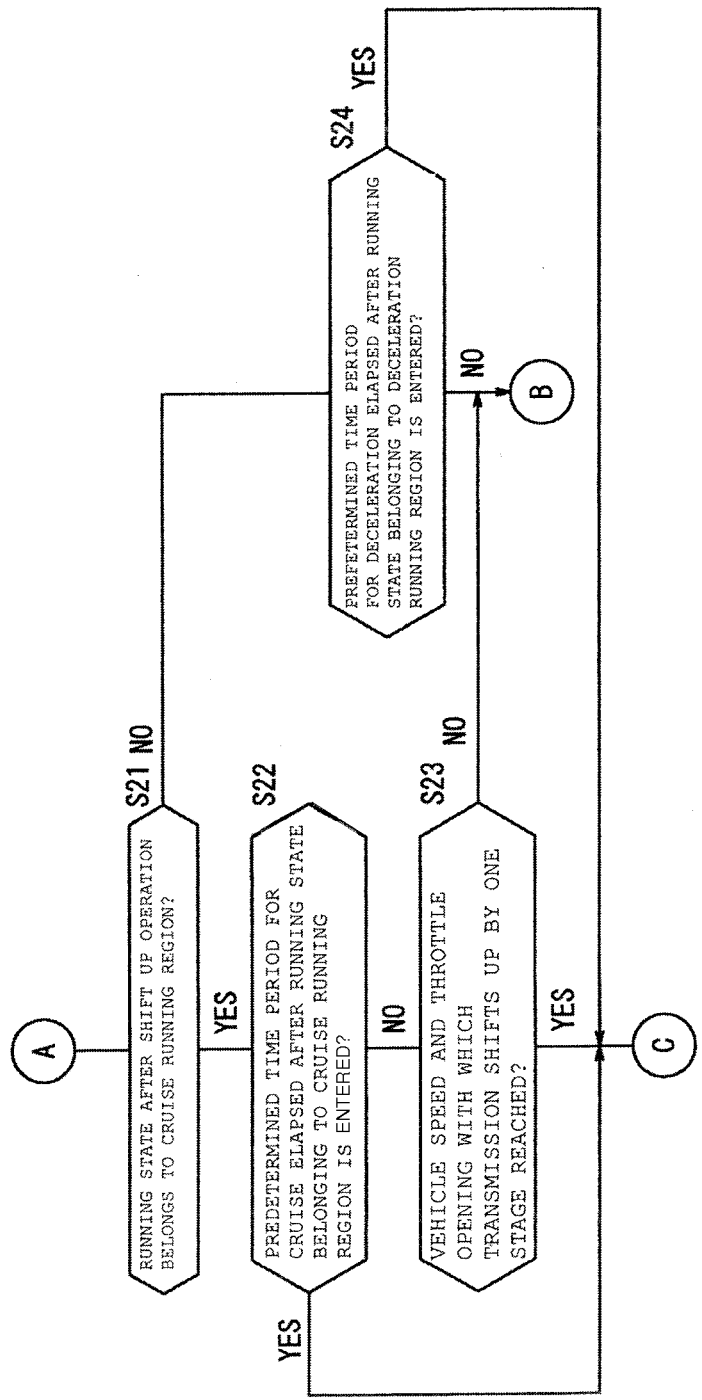

If it is decided at step S6 that the running state of the motorcycle 12 after the shift up operation is not a running state which belongs to the acceleration running region, then the processing advances to step S21 of FIG. 13, at which the returning condition decision section 216 decides whether or not the running state of the motorcycle 12 after the shift up operation is a running state which belongs to the cruise running region. In other words, it is decided at step S5 whether or not the running state of the motorcycle 12 discriminated latest is a running state in the cruise running region.

If it is decided at step S21 that the running state of the motorcycle 12 after the shift up operation is a running state which belongs to the cruise running region, then the returning condition decision section 216 decides whether or not a predetermined period of time for cruise (fourth predetermined time period) elapses after the running state belonging to the cruise running region is entered (step S22). It is to be noted that the predetermined time period for cruise is stored in the storage section 124.

If it is decided at step S22 that the predetermined time period for cruise does not elapse after the running state belonging to the cruise running region is entered, then the returning condition decision section 216 decides whether or not the vehicle speed and the throttle opening at present reach the vehicle speed and the throttle opening with which the automatic transmission 168 is to be shifted up based on the automatic shift map 230 (step S23). As the automatic shift map 230 to be used in the decision at step S23, the automatic shift map 230 used in the automatic shift mode in the preceding operation cycle is used.

Figure 12:
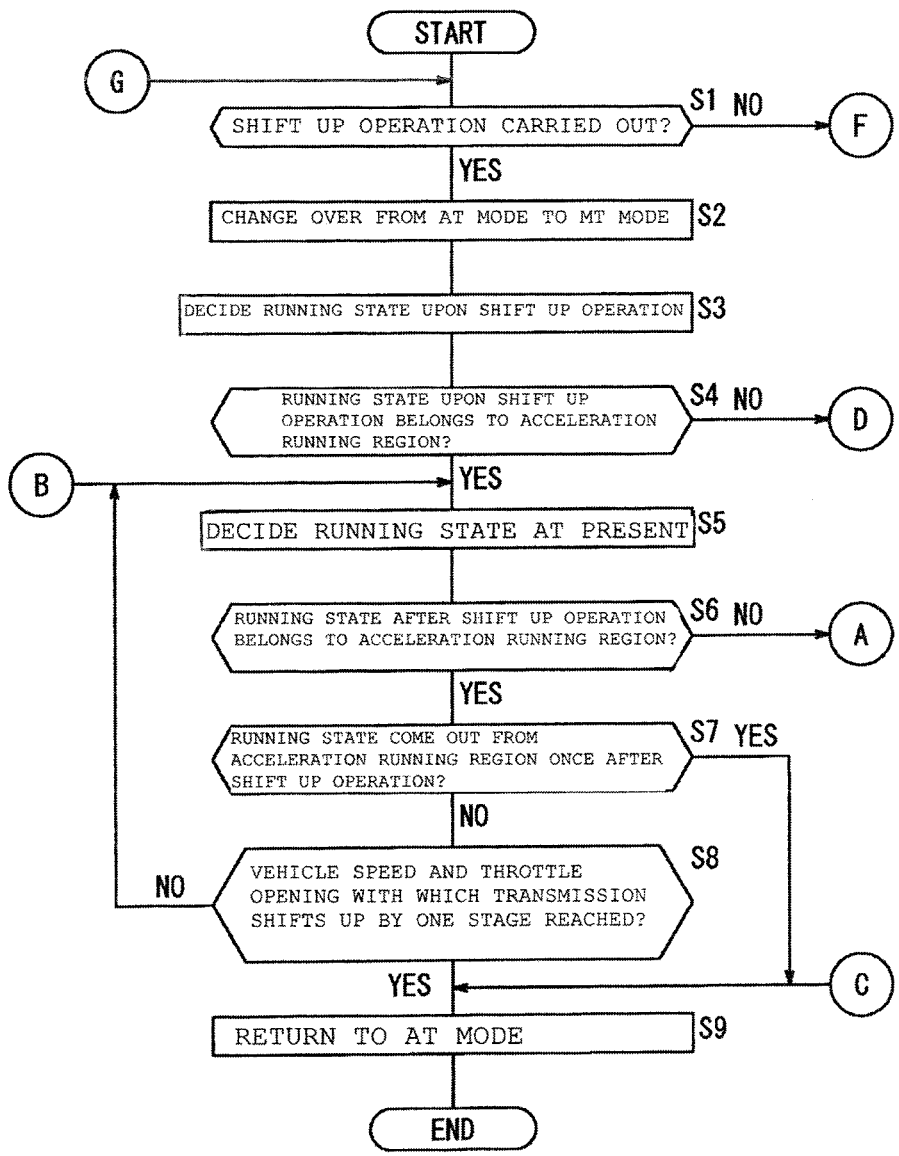
FIGS. 12-19 jointly illustrate a flow chart illustrating operation of automatic returning from the manual shift mode to the automatic shift mode in the exemplary embodiment.

If it is decided at step S23 that the vehicle speed and the throttle opening at present do not reach the vehicle speed and the throttle opening with which the automatic transmission 168 is to be shifted up based on the automatic shift map 230, then the processing returns to step S5 of FIG. 12.

On the other hand, if it is decided at step S22 that the predetermined time period for cruise elapses after the running state belonging to the cruise running region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 changes over the shift gear stage of the automatic transmission 168 based on the automatic shift map 230. In particular, if the running state of the motorcycle 12 upon the shift up operation is a running state in the acceleration running region and the running state of the motorcycle 12 after the shift up operation remains the running state in the cruise running region continuously for the predetermined time period for cruise, then the returning condition decision section 216 decides that the automatic returning condition is satisfied. Thus, the automatic shift mode returning section 218 automatically returns the shift mode to the automatic shift mode.

On the other hand, if it is decided at step S23 that the vehicle speed and the throttle opening at present reach the vehicle speed and the throttle opening with which the automatic transmission 168 is to be shifted up based on the automatic shift map 230, then the processing advances to step S9 of FIG. 12, at which the automatic shift mode returning section 218 automatically returns the shift mode to the automatic shift mode. Here, since the vehicle speed and the throttle opening reach the vehicle speed and the throttle opening with which the automatic transmission 168 is to be shifted up based on the automatic shift map 230, when the shift mode is automatically returned to the automatic shift mode, the automatic transmission controlling section 184 shifts up the shift gear stage of the automatic transmission 168.

In particular, if the running state of the motorcycle 12 upon the shift up operation is a running state in the acceleration running region and the running state of the motorcycle 12 after the shift up operation is a running state in the cruise running region and besides the vehicle speed and the throttle opening at present reach the vehicle speed and the throttle opening with which the automatic transmission 168 is to be shifted up based on the automatic shift map 230, then the returning condition decision section 216 decides that the automatic returning condition is satisfied. Thus, the automatic shift mode returning section 218 automatically returns the shift mode to the automatic shift mode.

If the running state of the motorcycle 12 upon the shift up operation is a running state in the acceleration running region and then enters a running state in the cruise running region, then it is considered that the driver wants to carry out cruise running with the shift gear stage after the shift up operation. Therefore, until the running state in the cruise running region continues for the predetermined time period for cruise or until the vehicle speed and the throttle opening reach the vehicle speed and the throttle opening with which the automatic transmission 168 is to be shifted up, the shift mode is not returned to the automatic shift mode. Therefore, cruise running can be carried out with the shift gear stage after the shift up operation. Further, the shift gear stage of the automatic transmission 168 does not change over frequently, and an unfamiliar feeling by frequent speed change is not provided to the driver.

On the other hand, if it is decided that the running state of the motorcycle 12 after the shift up operation is not a running state belonging to the cruise running region, that is, when the running state of the motorcycle 12 after the shift up operation is a running state belonging to the deceleration running region, the returning condition decision section 216 decides whether or not a predetermined time period for deceleration (second predetermined time period) elapses after a running state belonging to the deceleration running region is entered (step S24). It is to be noted that the predetermined time period for deceleration is stored in the storage section 124.

If it is decided at step S24 that the predetermined time period for deceleration does not elapse after the running state belonging to the deceleration running region is entered, then the processing returns to step S5 of FIG. 12. However, if it is decided at step S24 that the predetermined time period for deceleration elapses after the running state belonging to the deceleration running region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 changes over the shift gear stage of the automatic transmission 168 based on the automatic shift map 230.

In particular, if the running state of the motorcycle 12 upon the shift up operation is a running state in the acceleration running region and the running state of the motorcycle 12 after the shift up operation is the running state in the deceleration running region continuously for the predetermined time period for deceleration, then the returning condition decision section 216 decides that the automatic returning condition is satisfied. Thus, the automatic shift mode returning section 218 automatically returns the shift mode to the automatic shift mode.

If the running state of the motorcycle 12 upon the shift up operation is in a running state in the acceleration running region and thereafter enters a running state in the deceleration running region, then it is considered that the driver wants to carry out deceleration with the shift gear stage after the shift up operation. Therefore, since the shift mode does not return to the automatic shift mode until the running state in the deceleration running state continues for the predetermined time period for deceleration, the motorcycle 12 can run while being decelerated with the shift gear stage after the shift up operation. Further, the shift gear stage of the automatic transmission 168 does not frequently change over, and an unfamiliar feeling by frequent speed change is not provided to the driver.

Figure 14:
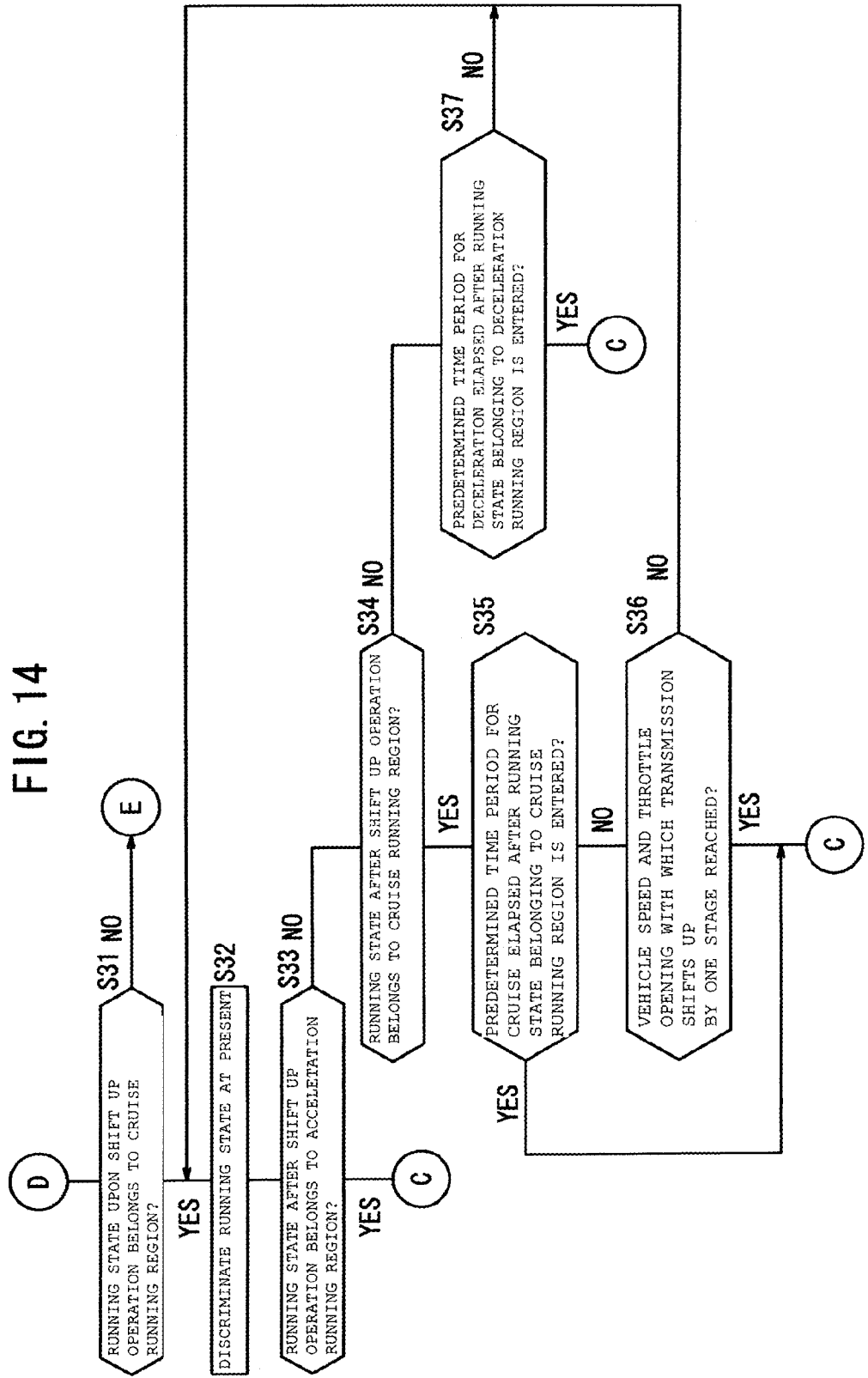

If it is decided at step S4 of FIG. 12 that the running state of the motorcycle 12 upon the shift up operation is not a running state belonging to the acceleration running region, then the processing advances to step S31 of FIG. 14, at which the returning condition decision section 216 decides whether or not the running state of the motorcycle 12 upon the shift up operation is a running state belonging to the cruise running region. In short, it is decided whether or not the running state decided latest at step S3 is a running state in the cruise running region.

If it is decided at step S31 that the running state of the motorcycle 12 upon the shift up operation is a running state belonging to the cruise running region, then the running state discrimination section 214 decides the running state at present using the automatic shift map 230 (step S32). In particular, the running state discrimination section 214 decides the running state of the motorcycle 12 at present from the throttle opening and the vehicle speed at present.

Then, the returning condition decision section 216 decides whether or not the running state of the motorcycle 12 after the shift up operation is a running state belonging to the acceleration running region (step S33). In particular, the returning condition decision section 216 decides whether or not the throttle opening and the vehicle speed at present are included in the acceleration running region of the running state discrimination map 232. In other words, the returning condition decision section 216 decides whether or not the running state of the motorcycle 12 decided latest at step S32 is a running state in the acceleration running region.

If it is decided at step S33 that the running state of the motorcycle 12 after the shift up operation is a running state belonging to the acceleration running region, then the processing advances to step S9 of FIG. 12, at which the automatic shift mode returning section 218 automatically returns the shift mode to the automatic shift mode. After the shift mode is returned to the automatic shift mode, the automatic transmission controlling section 184 changes over the shift gear stage of the automatic transmission 168 based on the automatic shift map 230.

In particular, if the running state of the motorcycle 12 upon the shift up operation is a running state in the cruise running region and a running state in the acceleration running region is entered after the shift up operation, then the returning condition decision section 216 decides that the automatic returning condition is satisfied. Thus, the automatic shift mode returning section 218 automatically returns the shift mode to the automatic shift mode.

If the running state of the motorcycle 12 upon the shift up operation is a running state in the cruise running region and then a running state in the acceleration running region is entered after the shift up operation, then it is considered that the driver wants to carry out kick down. Therefore, the shift mode is automatically returned to the automatic shift mode. Consequently, the automatic transmission controlling section 184 is permitted to execute kick down based on the automatic shift map 230, and it is possible to immediately satisfy a strong acceleration request of the driver.

On the other hand, if it is decided at step S33 that the running state of the motorcycle 12 after the shift up operation is not a running state belonging to the acceleration running region, then the returning condition decision section 216 decides whether or not the running state of the motorcycle 12 after the shift up operation is a running state belonging to the cruise running region (step S34). In other words, the returning condition decision section 216 decides whether or not the running state of the motorcycle 12 decided latest at step S32 is a running state in the cruise running region.

If it is decided at step S34 that the running state of the motorcycle 12 after the shift up operation is a running state belonging to the cruise running region, then the returning condition decision section 216 decides whether or not the predetermined time period for cruise (fourth predetermined time period) elapses after a running state belonging to the cruise running region is entered after the shift up operation (step S35).

If it is decided at step S35 that the predetermined time period for cruise does not elapse after a running state belonging to the cruise running region is entered after the shift up operation, then the returning condition decision section 216 decides whether or not the vehicle speed and the throttle opening (shift timing) with which the automatic transmission 168 is to be shifted up based on the automatic shift map 230 are reached (step S36) at present. As the automatic shift map 230 to be used in the decision at step S36, the automatic shift map 230 used in the preceding automatic shift mode is used.

If it is decided at step S36 that the vehicle speed and the throttle opening at present do not reach the vehicle speed and the throttle opening with which the automatic transmission 168 is to be shifted up based on the automatic shift map 230, then the processing returns to step S32.

On the other hand, if it is decided at step S35 that the predetermined time period for cruise elapses after the running state belonging to the cruise running region is entered after the shift up operation, then the processing advances to step S9 of FIG. 12, at which the automatic shift mode returning section 218 automatically returns the shift mode to the automatic shift mode. After the shift mode is returned to the automatic shift mode, the automatic transmission controlling section

184 changes over the shift gear state of the automatic transmission 168 based on the automatic shift map 230.

In particular, if the running state of the motorcycle 12 upon the shift up operation is a running state in the cruise running region and the running state of the motorcycle 12 after the shift up operation is the running state in the cruise running region continuously for the predetermined time period for cruise, then the returning condition decision section 216 decides that the automatic returning condition is satisfied. Thus, the automatic shift mode returning section 218 automatically returns the shift mode to the automatic shift mode.

On the other hand, if it is decided at step S36 that the vehicle speed and the throttle opening at present reach the vehicle speed and the throttle opening with which the automatic transmission 168 is to be shifted up based on the automatic shift map 230, then the processing advances to step S9 of FIG. 12, at which the automatic shift mode returning section 218 automatically returns the shift mode to the automatic shift mode. Here, since the vehicle speed and the throttle opening reach the vehicle speed and the throttle opening with which the automatic transmission 168 is to be shifted up based on the automatic shift map 230, after the shift mode automatically returns the automatic shift mode, the automatic transmission controlling section 184 controls the automatic transmission 168 to shift up the shift gear stage.

In particular, if the running state of the motorcycle 12 upon the shift up operation is a running state in the cruise running region and the running state of the motorcycle 12 after the shift up operation is the running state in the cruise running region and besides the vehicle speed and the throttle opening at present reach the vehicle speed and the throttle opening with which the automatic transmission 168 is to be shifted up based on the automatic shift map 230, then the returning condition decision section 216 decides that the automatic returning condition is satisfied. Thus, the automatic shift mode returning section 218 automatically returns the shift mode to the automatic shift mode.

If the running state of the motorcycle 12 upon the shift up operation is a running state in the cruise running region and the running state of the motorcycle 12 after the shift up operation is the running state in the cruise running region, then it is considered that the driver wants to carry out cruise running with the shift gear stage after the shift up operation. Therefore, until the running state in the cruise running region continues for the predetermined time period for cruise or until the vehicle speed and the throttle opening at present become the vehicle speed and the throttle opening with which the automatic transmission 168 is to be shifted up, the shift mode does not automatically return to the automatic shift mode. Therefore, the motorcycle 12 can carry out cruise running with the shift gear stage after the shift up operation. Further, the shift gear stage of the automatic transmission 168 does not change over frequently, and an unfamiliar feeling by frequent speed change is not provided to the driver.

If it is decided at step S34 that the running state of the motorcycle 12 after the shift up operation is not a running state belonging to the cruise running region, that is, if it is decided that the running state of the motorcycle 12 after the shift up operation belongs to the deceleration running region, then the returning condition decision section 216 decides whether or not the predetermined time period for deceleration (second predetermined time period) elapses after the running state belonging to the deceleration running region is entered (step S37).

If it is decided at step S37 that the predetermined time period for deceleration does not elapse after the running state belonging to the deceleration running region is entered, then the processing returns to step S32. However, if it is decided at step S37 that the predetermined time period for deceleration elapses after the running state belonging to the deceleration running region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 changes over the shift gear stage of the automatic transmission 168 based on the automatic shift map 230.

In particular, if the running state of the motorcycle 12 upon the shift up operation is a running state in the cruise running region and the running state of the motorcycle 12 after the shift up operation is a running state in the deceleration running region continuously for the predetermined time period for deceleration, then the returning condition decision section 216 decides that the automatic returning condition is satisfied. Thus, the automatic shift mode returning section 218 automatically returns the shift mode to the automatic shift mode.

If the running state of the motorcycle 12 upon the shift up operation is a running state in the cruise running region and then a running state in the deceleration running region is entered, then it is considered that the driver wants to carry out deceleration running with the shift gear stage after the shift up operation. Therefore, until the running state of the deceleration running region continues for the predetermined time period for deceleration, the shift mode does not automatically return to the automatic shift mode, and therefore, the motorcycle 12 can run while decelerating with the shift gear stage after the shift up operation. Further, the shift gear stage of the automatic transmission 168 does not change over frequently, and an unfamiliar feeling by frequent speed change is not provided to the driver.

Figure 15:
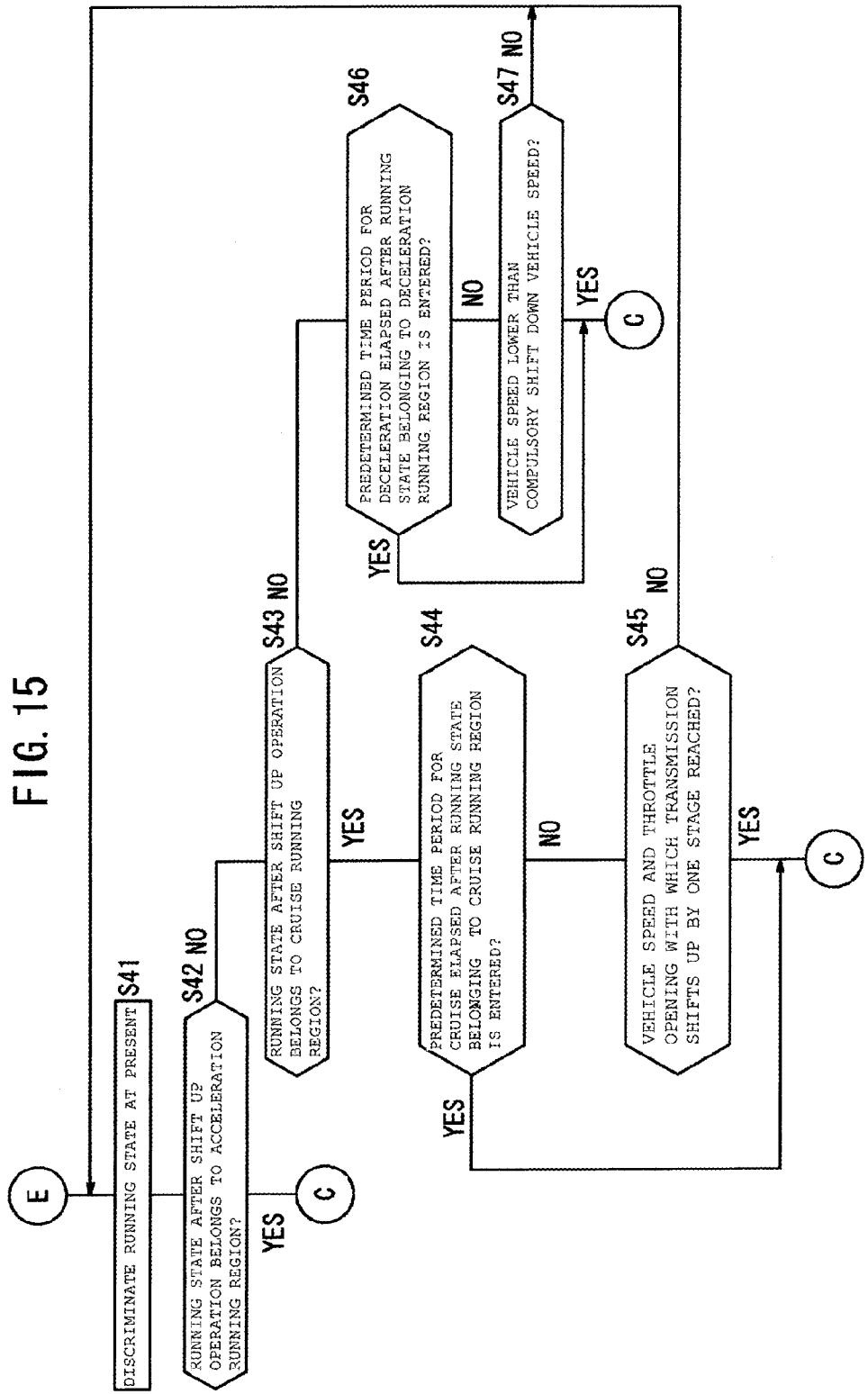

On the other hand, if it is decided at step S31 that the running state of the motorcycle 12 upon the shift up operation is not a running state belonging to the cruise running region, that is, if the running state of the motorcycle 12 upon the shift up operation is a running state belonging to the deceleration running region, then the processing advances to step S41 of FIG. 15, at which the running state discrimination section 214 decides the running state of the motorcycle 12 at present using the running state discrimination map 232. In other words, the running state discrimination section 214 decides the running state of the motorcycle 12 at present from the vehicle speed and the throttle opening at present.

Then, the returning condition decision section 216 decides whether or not the running state of the motorcycle 12 after the shift up operation is a running state belonging to the acceleration running region (step S42). In other words, the returning condition decision section 216 decides whether or not the running state of the motorcycle 12 decided latest at step S42 is a running state in the acceleration running region.

If it is decided at step S42 that the running state of the motorcycle 12 after the shift up operation is a running state belonging to the acceleration running region, then the processing advances to step S9 of FIG. 12, at which the automatic shift mode returning section 218 automatically returns the shift mode to the automatic shift mode. After the shift mode is returned to the automatic shift mode, the automatic transmission controlling section 184 changes over the shift gear stage of the automatic transmission 168 based on the automatic shift map 230.

In particular, if the running state of the motorcycle 12 upon the shift up operation is a running state in the deceleration running region and the running state of the motorcycle 12 after the shift up operation is a running state in the acceleration running region, then the returning condition decision section 216 decides that the automatic returning condition is satisfied. Thus, the automatic shift mode returning section 218 automatically returns the shift mode to the automatic shift mode.

If the running state of the motorcycle 12 upon the shift up operation is a running state in the deceleration running region and a running state in the acceleration running region is entered after the shift up operation, then it is considered that the driver wants to carry out kick down. Therefore, the shift mode is automatically returned to the automatic shift mode. Consequently, the automatic transmission controlling section 184 is permitted to execute kick down based on the automatic shift map 230, and it is possible to satisfy a strong acceleration request of the driver.

If it is decided at step S42 that the running state of the motorcycle 12 after the shift up operation is not a running state belonging to the acceleration running region, then the returning condition decision section 216 decides whether or not the running state of the motorcycle 12 after the shift up operation is a running state belonging to the cruise running region (step S43). In other words, the returning condition decision section 216 decides whether or not the running state of the motorcycle 12 decided latest at step S41 is a running state in the cruise running region.

If it is decided at step S43 that the running state of the motorcycle 12 after the shift up operation is a running state belonging to the cruise running region, then the returning condition decision section 216 decides whether or not the predetermined time period for cruise (fourth predetermined time period) elapses after the running state belonging cruise running region is entered (step S44).

If it is decided at step S44 that the predetermined time period for cruise does not elapse after the running state belonging to the cruise running region is entered, then the returning condition decision section 216 decides whether or not the vehicle speed and the throttle opening at present reach the vehicle speed and the throttle opening with which the automatic transmission 168 is to be shifted up based on the automatic shift map 230 (step S45). As the automatic shift map 230 to be used in the decision at step S45, the automatic shift map 230 used in the automatic shift mode in the preceding operation cycle is used.

If it is decided at step S45 that the vehicle speed and the throttle opening at present do not reach the vehicle speed and the throttle opening with which the automatic transmission 168 is to be shifted up based on the automatic shift map 230, then the processing returns to step S41.

On the other hand, if it is decided at step S44 that the predetermined time period for cruise elapses after the running state belongs to the cruise running region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 changes over the shift gear stage of the automatic transmission 168 based on the automatic shift map 230.

In particular, if the running state of the motorcycle 12 upon the shift up operation is a running state in the deceleration running region and the running state of the motorcycle 12 after the shift up operation is a running state in the cruise running region continuously for the predetermined time period for cruise, then the returning condition decision section 216 decides that the automatic returning condition is satisfied. Thus, the automatic shift mode returning section 218 automatically returns the shift mode to the automatic shift mode.

On the other hand, if it is decided at step S45 that the vehicle speed and the throttle opening at present reach the vehicle speed and the throttle opening with which the automatic transmission 168 is to be shifted up based on the automatic shift map 230, then the processing advances to step S9 of FIG. 12, at which the automatic shift mode returning section 218 automatically returns the shift mode to the automatic shift mode. Here, since the vehicle speed and the throttle opening already reach the vehicle speed and the throttle opening with which the automatic transmission 168 is to be shifted up based on the automatic shift map 230, when the shift mode automatically returns to the automatic shift mode, the automatic transmission controlling section 184 controls the automatic transmission 168 to shift up the shift gear stage.

In particular, if the running state of the motorcycle 12 upon the shift up operation is a running state in the deceleration running region and the running state of the motorcycle 12 after the shift up operation is the running state in the cruise running region and besides the vehicle speed and the throttle opening at present reach the vehicle speed and the throttle opening with which the automatic transmission 168 is to be shifted up based on the automatic shift map 230, then the returning condition decision section 216 decides that the automatic returning condition is satisfied. Thus, the automatic shift mode returning section 218 automatically returns the shift mode to the automatic shift mode.

If the running state of the motorcycle 12 upon the shift up operation is a running state in the deceleration running region and then the running state of the motorcycle 12 after the shift up operation is a running state in the cruise running region, then it is considered that the driver wants to carry out cruise running with the shift gear stage after the shift up operation. Therefore, until the running state of the cruise running region continues for the predetermined time period for cruise or until the vehicle speed and the throttle opening at present reach the vehicle speed and the throttle opening with which the automatic transmission 168 is to be shifted up, the shift mode does not automatically return to the automatic shift mode, and therefore, cruise running can be carried out with the shift gear stage after the shift up operation. Further, the shift gear stage of the automatic transmission 168 does not change over frequently, and an unfamiliar feeling by frequent speed change is not provided to the driver.

If it is decided at step S43 that the running state of the motorcycle 12 after the shift up operation is not a running state belonging to the cruise running region, that is, if the running state of the motorcycle 12 after the shift up operation is a running state belonging to the deceleration running region, then the returning condition decision section 216 decides whether or not the predetermined time period for deceleration (second predetermined time period) elapses after the running state belonging to the deceleration running region is entered after the shift up operation (step S46).

If it is decided at step S46 that the predetermined time period for deceleration does not elapse after the running state belonging to the deceleration running region is entered after the shift up operation, then the returning condition decision section 216 decides whether or not the vehicle speed at present is lower than a compulsory shift down vehicle speed (step S47). If it is decided at step S47 that the vehicle speed at present is not lower than the compulsory shift down vehicle speed, then the processing returns to step S41.

If it is decided at step S46 that the predetermined time period for deceleration elapses after the running state belonging to the deceleration running region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 controls the automatic transmission 168 to change over the shift gear stage based on the automatic shift map 230.

In particular, if the running state of the motorcycle 12 upon the shift up operation is a running state in the deceleration running region and the running state of the motorcycle 12 after the shift up operation is the running state in the deceleration running region continuously for the predetermined time period for deceleration, then the returning condition decision section 216 decides that the automatic returning condition is satisfied. Thus, the automatic shift mode returning section 218 automatically returns the shift mode to the automatic shift mode.

If the running state of the motorcycle 12 upon the shift up operation is a running state in the deceleration running region and the running state of the motorcycle 12 after the shift up operation is the running state in the deceleration running region, then it is considered that the driver wants to carry out deceleration running with the shift gear stage after the shift up operation. Therefore, until the running state of the deceleration running region continues for the predetermined time period for deceleration, the shift mode does not automatically return to the automatic shift mode, and therefore, the motorcycle 12 can run while decelerating with the shift gear stage after the shift up operation. Further, the shift gear stage of the automatic transmission 168 does not change over frequently, and an unfamiliar feeling by frequent speed change is not provided to the driver.

On the other hand, if it is decided at step S47 that the vehicle speed at present is lower than the compulsory shift down vehicle speed, then the processing advances to step S9 of FIG. 12, at which the automatic shift mode returning section 218 automatically returns the shift mode to the automatic shift mode. After the shift mode is returned to the automatic shift mode, the automatic transmission controlling section 184 changes over the shift gear stage of the automatic transmission 168 based on the automatic shift map 230. In particular, if the running state of the motorcycle 12 upon the shift up operation is a running state in the deceleration running region and the running state of the motorcycle 12 after the shift up operation is the running state in the deceleration running region and besides the vehicle speed is lower than a compulsory shift down vehicle speed, then the returning condition decision section 216 decides that the automatic returning condition is satisfied. Thus, the automatic shift mode returning section 218 automatically returns the shift mode to the automatic shift mode.

Figure 16:
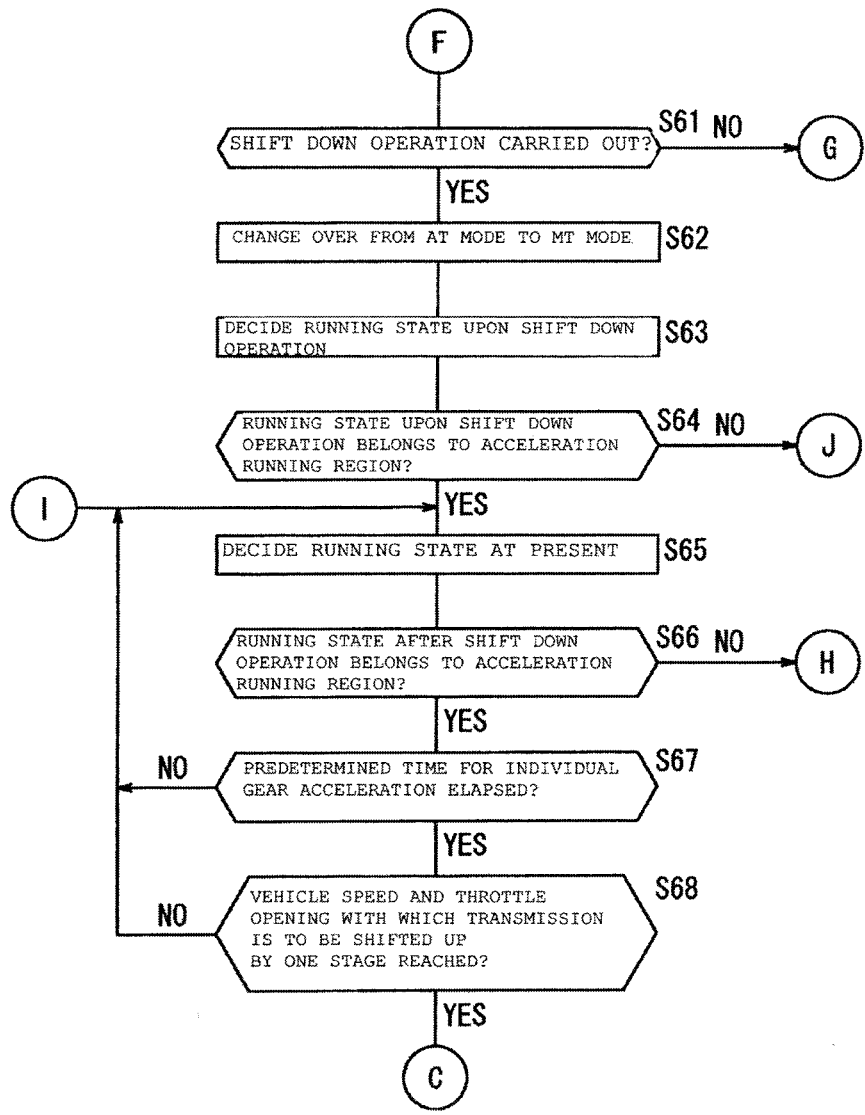
Figure 17:
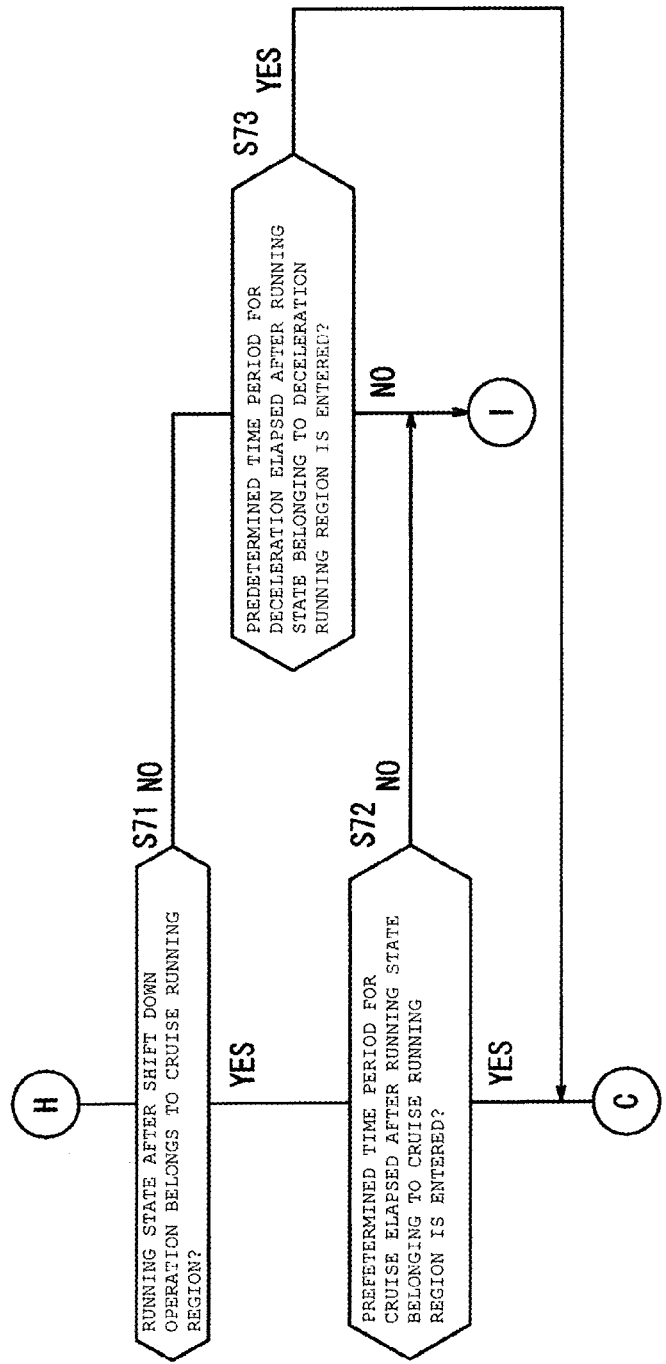

If it is decided at step S1 of FIG. 12 that, when the motorcycle 12 is running in the automatic shift mode, the shift up switch 102 is not operated by the driver, then the processing advances to step S61 of FIG. 16, at which the manual operation detection section 210 discriminates whether or not the shift down switch 104 is operated by the driver.

If it is decided at step S61 that the shift down switch 104 is not operated, then the processing returns to step S1 of FIG. 12, but if it is decided that the shift down switch 104 is operated (a shift down operation is carried out), then the manual shift mode changeover section 212 changes over the shift mode from the automatic shift mode to the manual shift mode (step S62). After the shift mode is changed over to the manual shift mode, the automatic transmission controlling section 184 changes over the shift gear stage of the automatic transmission 168 in response to an operation of the shift up switch 102 or the shift down switch 104. Here, since an operation of the shift down switch 104 is detected at step S61 and the shift mode is changed over to the manual shift mode, the automatic transmission controlling section 184 controls the automatic transmission 168 to shift down the shift gear stage by one stage in response to the operation of the shift down switch 104 detected at step S61.

Then, the running state discrimination section 214 decides the running state of the motorcycle 12 upon the shift down operation (manual operation for shift down) (step S63). The running state discrimination section 214 uses the running state discrimination map 232 to decide the running state of the motorcycle 12 upon the shift down operation from the throttle opening and the vehicle speed upon the shift down operation. This throttle opening is detected by the throttle opening sensor 172, and the vehicle speed is detected by the vehicle speed sensor 178.

Then, the returning condition decision section 216 decides whether or not the running state of the motorcycle 12 upon the shift down operation belongs to the acceleration running region (step S64). In particular, the returning condition decision section 216 decides whether or not the throttle opening and the vehicle speed upon the shift down operation are included in the acceleration running region. In other words, the returning condition decision section 216 decides whether or not the running state of the motorcycle 12 decided at step S63 is a running state in the acceleration running region.

If it is decided at step S64 that the running state of the motorcycle 12 upon the shift down operation is a running state which belongs to the acceleration running region, then the running state discrimination section 214 decides the running state at present using the running state discrimination map 232 (step S65). In other words, the running state discrimination section 214 decides the running state of the motorcycle 12 at present from the throttle opening and the vehicle speed at present.

Then, the returning condition decision section 216 decides whether or not the running state of the motorcycle 12 after the shift down operation is a running state belonging to the acceleration running region (step S66). In particular, the returning condition decision section 216 decides whether or not the throttle opening and the vehicle speed at present are included in the acceleration running region of the running state discrimination map 232. In other words, the returning condition decision section 216 decides whether or not the running state of the motorcycle 12 decided latest at step S65 is a running state in the acceleration running region.

If it is decided at step S66 that the running state of the motorcycle 12 after the shift down operation is a running state belonging to the acceleration running region, then the returning condition decision section 216 decides whether or not a predetermined time period for individual gear acceleration (first predetermined time period) elapses after the running state belonging to the acceleration running region is entered (step S67).

The predetermined time period for individual gear acceleration is a predetermined time period determined in response to each shift gear stage, and the returning condition decision section 216 makes a decision using a predetermined time period for individual gear acceleration corresponding to the shift gear stage of the automatic transmission 168 at present. For example, if the shift gear stage of the automatic transmission 168 at present is the third speed, then the returning condition decision section 216 makes a decision using the predetermined time period for individual gear acceleration determined in accordance with the third speed. Such predetermined time periods for individual gear acceleration are stored in the storage section 124, and the predetermined time period for individual gear acceleration is longer in time for a shift gear state for a lower speed (nearer to the first speed). The shift gear stage at present is detected by the gear position sensor 176.

If it is decided at step S67 that the predetermined time period for individual gear acceleration does not elapse after the running state belonging to the acceleration running region is entered, then the processing returns to step S65. However, if it is decided at step S67 that the predetermined time period for individual gear acceleration elapses after the running state belonging to the acceleration running region is entered, then the returning condition decision section 216 decides whether or not the vehicle speed and the throttle opening at present reach the vehicle speed and the throttle opening with which the automatic transmission 168 is to be shifted up based on the automatic shift map 230 (step S68). As the automatic shift map 230 to be used in the decision at step S68, the automatic shift map 230 used in the automatic shift mode in the preceding operation cycle is used.

If it is decided at step S68 that the vehicle speed and the throttle opening at present do not reach the vehicle speed and the throttle opening with which the automatic transmission 168 is to be shifted up based on the automatic shift map 230, then the processing returns to step S65.

On the other hand, if it is decided at step S68 that the vehicle speed and the throttle opening at present reach the vehicle speed and the throttle opening with which the automatic transmission 168 is to be shifted up based on the automatic shift map 230, then the processing advances to step S9 of FIG. 12, at which the shift mode is automatically returned to the automatic shift mode. Since the vehicle speed and the throttle opening at present reach the vehicle speed and the throttle opening with which the automatic transmission 168 is to be shifted up based on the automatic shift map 230, when the shift mode automatically returns to the automatic shift mode, the automatic transmission controlling section 184 controls the automatic transmission 168 to shift up the shift gear stage.

In particular, if the running state of the motorcycle 12 upon the shift down operation is a running state in the acceleration running region and the running state of the motorcycle 12 after the shift down operation is the running state in the acceleration running region continuously for the predetermined time period for individual gear acceleration and besides the vehicle speed and the throttle opening at present reach the vehicle speed and the throttle opening with which the automatic transmission 168 is to be shifted up based on the automatic shift map 230, then the returning condition decision section 216 decides that the automatic returning condition is satisfied. Thus, the automatic shift mode returning section 218 automatically returns the shift mode to the automatic shift mode.

If the running state of the motorcycle 12 upon the shift down operation is a running state in the acceleration running region and the running state of the motorcycle 12 after the shift down operation is the running state in the acceleration running region, then it is considered that the driver wants to carry out strong acceleration by shift down. Therefore, when the predetermined time period for individual gear acceleration elapses in the running state in the acceleration running region and the vehicle speed and the throttle opening at present become the vehicle speed and the throttle opening with which shift up is to be carried out, the shift mode is returned to the automatic shift mode finally and shift up is carried out. Therefore, such a situation that shift up is carried out immediately and strong acceleration does not continue can be prevented, and the request for strong acceleration of the driver can be satisfied. Further, since the predetermined time for individual gear acceleration is shorter with a shift gear stage for a lower speed, the expectation of the driver who requests stronger acceleration for a lower speed gear position can be satisfied.

If it is decided at step S66 that the running state of the motorcycle 12 after the shift down operation is not a running state belonging to the acceleration running region, then the processing advances to step S71, at which the returning condition decision section 216 decides whether or not the running state of the motorcycle 12 after the shift down operation is a running state belonging to the cruise running region. In other words, the returning condition decision section 216 decides whether or not the running state of the motorcycle 12 decided latest at step S65 is a running state in the cruise running region.

If it is decided at step S71 that the running state of the motorcycle 12 after the shift down operation is a running state belonging to the cruise running region, then the returning condition decision section 216 decides whether or not the predetermined time period for cruise (third predetermined time period) elapses after the running state belonging to the cruise running region is entered (step S72).

If it is decided at step S72 that the predetermined time period for cruise does not elapse after the running state belonging to the cruise running region is entered, then the processing returns to step S65 of FIG. 16. However, if it is decided at step S72 that the predetermined time period for cruise elapses after the running state belonging to the cruise running region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 controls the automatic transmission 168 to change over the shift gear stage based on the automatic shift map 230.

In particular, if the running state of the motorcycle 12 upon the shift down operation is a running state in the acceleration running region and the running state of the motorcycle 12 after the shift down operation is a running state in the cruise running region continuously for the predetermined time period for cruise, then the returning condition decision section 216 decides that the automatic returning condition is satisfied. Thus, the automatic shift mode returning section 218 automatically returns the shift mode to the automatic shift mode.

If the running state of the motorcycle 12 upon the shift down operation is a running state in the acceleration running region and then a running state in the cruise running region state is entered, then it is considered that the driver wants to carry out cruise running with the shift gear stage after the shift down operation. Therefore, until the running state in the cruise running region continues for the predetermined time period for cruise, the shift mode is not automatically returned to the automatic shift mode. Therefore, cruise running can be carried out with the shift gear stage after the shift up operation. Further, the shift gear stage of the automatic transmission 168 does not change over frequently, and an unfamiliar feeling by frequent speed change is not provided to the driver.

On the other hand, if it is decided at step S71 that the running state of the motorcycle 12 after the shift down operation is not a running state belonging to the cruise running region, or in other words, if the running state of the motorcycle 12 after the shift down operation is a running state belonging to the deceleration running region, then the returning condition decision section 216 decides whether or not the predetermined time period for deceleration (second predetermined time period) elapses after the running state belonging to the deceleration running region is entered (step S73).

If it is decided at step S73 that the predetermined time period for deceleration does not elapse after the running state belonging to the deceleration running region is entered, then the processing returns to step S65 of FIG. 16. However, if it is decided that the predetermined time period for deceleration elapses after the running state belonging to the deceleration running region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 controls the automatic transmission 168 to change over the shift gear stage based on the automatic shift map 230.

In particular, if the running state of the motorcycle 12 upon the shift down operation is a running state in the acceleration running region and the running state of the motorcycle 12 after the shift down operation is a running state in the deceleration running region continuously for the predetermined time period for deceleration, then the returning condition decision section 216 decides that the automatic returning condition is satisfied. Thus, the automatic shift mode returning section 218 returns the shift mode to the automatic shift mode.

If the running state of the motorcycle 12 upon the shift down operation is a running state in the acceleration running region and then enters a running state in the deceleration running region, then it is considered that the driver wants to carry out deceleration running with the shift gear stage after the shift down operation. Therefore, until the running state in the deceleration running region continues for the predetermined time period for deceleration, the shift mode is not returned to the automatic shift mode. Therefore, deceleration running can be carried out with the shift gear stage after the shift down operation. Further, the shift gear stage of the automatic transmission 168 does not change over frequently, and an unfamiliar feeling by frequent speed change is not provided to the driver.

If it is decided at step S64 of FIG. 16 that the running state of the motorcycle 12 upon the shift down operation is not a running state belonging to the acceleration running region, then the processing advances to step S81 in FIG. 18, at which the returning condition decision section 216 decides whether or not the running state of the motorcycle 12 upon the shift down operation is a running state belonging to the cruise running region. In other words, the returning condition decision section 216 decides whether or not the running state decided at step S63 of FIG. 16 is a running state in the cruise running region.

If it is decided at step S81 that the running state of the motorcycle 12 upon the shift down operation is a running state belonging to the cruise running region, then the running state discrimination section 214 decides the running state at present using the running state discrimination map 232 (step S82). In other words, the running state discrimination section 214 decides the running state of the motorcycle 12 at present from the throttle opening and the vehicle speed at present.

Then, the returning condition decision section 216 decides whether or not the running state of the motorcycle 12 after the shift down operation is a running state belonging to the acceleration running region (step S83). In other words, the returning condition decision section 216 decides whether or not the running state of the motorcycle 12 decided latest at step S82 is a running state in the acceleration running region.

If it is decided at step S83 that the running state of the motorcycle 12 after the shift down operation is a running state belonging to the acceleration running region, then the returning condition decision section 216 decides whether or not the predetermined time period for individual gear acceleration (first time period) elapses after the running state belonging to the acceleration running region is entered (step S84).

If it is decided at step S84 that the predetermined time period for individual gear acceleration does not elapse after the running state belonging to the acceleration running region is entered, the processing returns to step S82. On the other hand, if it is decided at step S84 that the predetermined time period for individual gear acceleration elapses after the running state belonging to the acceleration running region is entered, then the returning condition decision section 216 decides whether or not the vehicle speed and the throttle opening at present reach the vehicle speed and the throttle opening (shift timing) with which the automatic transmission 168 is to be shifted up based on the automatic shift map 230 (step S85). As the automatic shift map 230 to be used in the decision at step S85, the automatic shift map 230 used in the automatic shift mode in the preceding operation cycle is used.

If it is decided at step S85 that the vehicle speed and the throttle opening at present do not reach the vehicle speed and the throttle opening with which the automatic transmission 168 is to be shifted up based on the automatic shift map 230, then the processing returns to step S82.

On the other hand, if it is decided at step S85 that the vehicle speed and the throttle opening at present reach the vehicle speed and the throttle opening with which the automatic transmission 168 is to be shifted up based on the automatic shift map 230, then the processing advances to step S9 of FIG. 12, at which the shift mode is automatically returned to the automatic shift mode. Since the vehicle speed and the throttle opening already reach the vehicle speed and the throttle opening with which the automatic transmission 168 is to be shifted up based on the automatic shift map 230, after the shift mode is automatically returned to the automatic shift mode, the automatic transmission controlling section 184 controls the automatic transmission 168 to shift up the shift gear stage.

In particular, if the running state of the motorcycle 12 upon the shift down operation is a running state in the cruise running region and the running state of the motorcycle 12 after the shift down operation is a running state in the acceleration running region continuously for the predetermined time period for individual gear acceleration and besides the vehicle speed and the throttle opening at present reach the vehicle speed and the throttle opening with which the automatic transmission 168 is to be shifted up based on the automatic shift map 230, then the returning condition decision section 216 decides that the automatic returning condition is satisfied. Thus, the automatic shift mode returning section 218 returns the shift mode to the automatic shift mode.

If the running state of the motorcycle 12 upon the shift down operation is a running state in the cruise running state and the running state of the motorcycle 12 after the shift down operation is a running state in the acceleration running region, then it is considered that the driver wants to carry out strong acceleration by shift down. Therefore, when the predetermined time period for individual gear acceleration elapses in the running state in the acceleration running region and the vehicle speed and the throttle opening at present become the vehicle speed and the throttle opening with which shift up is to be carried out, the shift mode is returned to the automatic shift mode finally and shift up is carried out. Therefore, such a situation that shift up is carried out immediately and strong acceleration does not continue can be prevented, and the request for strong acceleration of the driver can be satisfied.

On the other hand, if it is decided at step S83 that the running state of the motorcycle 12 after the shift down operation is not a running state belonging to the acceleration running region, then the returning condition decision section 216 decides whether or not the running state of the motorcycle 12 after the shift down operation is a running state belonging to the cruise running region (step S86). In other words, the returning condition decision section 216 decides whether or not the running state of the motorcycle 12 decided latest is a running state in the cruise running region.

If it is decided at step S86 that the running state of the motorcycle 12 after the shift down operation is a running state belonging to the cruise running region, then the returning condition decision section 216 decides whether or not the predetermined time period for cruise (third predetermined time period) elapses after the running state belonging to the cruise running region is entered after the shift down operation (step S87).

If it is decided at step S87 that the predetermined time period for cruise does not elapse after the running state belonging to the cruise running region is entered after the shift down operation, then the processing returns to step S82. However, if it is decided that the predetermined time period for cruise elapses after the running state belonging to the cruise running region is entered after the shift down operation, then the processing advances to step S9 of FIG. 12, at which the automatic shift mode returning section 218 automatically returns the shift mode to the automatic shift mode. After the shift mode is returned to the automatic shift mode, the automatic transmission controlling section 184 controls the automatic transmission 168 to change over the shift gear stage based on the automatic shift map 230.

In particular, if the running state of the motorcycle 12 upon the shift down operation is a running state in the cruise running region and the running state of the motorcycle 12 after the shift down operation is a running state in the cruise running region continuously for the predetermined time period for cruise, then the returning condition decision section 216 decides that the automatic returning condition is satisfied. Thus, the automatic shift mode returning section 218 returns the shift mode to the automatic shift mode.

If the running state of the motorcycle 12 upon the shift down operation is a running state in the cruise running region and the running state of the motorcycle 12 after the shift down operation is a running state in the cruise running region, then it is considered that the driver wants to carry out cruise running with the shift gear stage after the shift down operation. Therefore, until the running state in the cruise running region continues for the predetermined time period for cruise, the shift mode does not automatically return to the automatic shift mode. Therefore, the motorcycle 12 can carry out cruise running with the shift gear stage after the shift down operation. Further, the shift gear stage of the automatic transmission 168 does not change over frequently, and an unfamiliar feeling by frequent speed change is not provided to the driver.

On the other hand, if it is determined at step S86 that the running state of the motorcycle 12 after the shift down operation does not belong to a running state in the cruise running region, that is, if the running state of the motorcycle 12 after the shift down operation belongs to a running state in the deceleration running region, then the returning condition decision section 216 decides whether or not the predetermined time period for deceleration (second predetermined time period) elapses after the running state belonging to the deceleration running region is entered after the shift down operation (step S88).

If it is decided at step S88 that the predetermined time period for deceleration does not elapse after the running state belonging to the deceleration running region is entered, then the processing returns to step S82. However, if it is decided that the predetermined time period for deceleration elapses after the running state belonging to the deceleration running region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 controls the automatic transmission 168 to change over the shift gear stage based on the automatic shift map 230.

In particular, if the running state of the motorcycle 12 upon the shift down operation is a running state in the cruise running region and the running state of the motorcycle 12 after the shift down operation is a running state in the deceleration running region continuously for the predetermined time period for deceleration, then the returning condition decision section 216 decides that the automatic returning condition is satisfied. Thus, the automatic shift mode returning section 218 returns the shift mode to the automatic shift mode.

If the running state of the motorcycle 12 upon the shift down operation is a running state in the cruise running region and thereafter a running state in the deceleration running region is entered, then it is considered that the driver wants to carry out deceleration running with the shift gear stage after the shift down operation. Therefore, until the running state in the deceleration running region continues for the predetermined time period for deceleration, the shift mode is not returned to the automatic shift mode. Therefore, deceleration running can be carried out with the shift gear stage after the shift down operation. Further, the shift gear stage of the automatic transmission 168 does not change over frequently, and an unfamiliar feeling by frequent speed change is not provided to the driver.

If it is decided at step S81 that the running state of the motorcycle 12 upon the shift down operation is not a running state belonging to the cruise running region, that is, if the running state of the motorcycle 12 upon the shift down operation is a running state belonging to the deceleration running region, then the processing advances to step S100 of FIG. 19, at which the running state discrimination section 214 decides the running state at present using the running state discrimination map 232. In other words, the running state discrimination section 214 decides the running state of the motorcycle 12 at present from the throttle opening and the vehicle speed at present.

Then, the returning condition decision section 216 decides whether or not the running state of the motorcycle 12 after the shift down operation is a running state belonging to the acceleration running region (step S101). In other words, the returning condition decision section 216 decides whether or not the running state decided latest at step S100 is a running state belonging to the acceleration running region.

If it is decided that the running state of the motorcycle 12 after the shift down operation is a running state belonging to the acceleration running region, then the processing advances to step S9 of FIG. 12, at which the automatic shift mode returning section 218 automatically returns the shift mode to the automatic shift mode. After the shift mode is returned to the automatic shift mode, the automatic transmission controlling section 184 controls the automatic transmission 168 to change over the shift gear stage based on the automatic shift map 230.

In particular, if the running state of the motorcycle 12 upon the shift down operation is a running state in the deceleration running region and a running state in the acceleration running region is entered after the shift down operation, then the returning condition decision section 216 decides that the automatic returning condition is satisfied. Thus, the automatic shift mode returning section 218 returns the shift mode to the automatic shift mode.

If the running state of the motorcycle 12 upon the shift down operation is a running state in the deceleration running region and a running state in the acceleration running region is entered after the shift down operation, then since it is considered that the driver wants to carry out kick down, the shift mode is automatically returned to the automatic shift mode. Consequently, the automatic transmission controlling section 184 is permitted to execute kick down based on the automatic shift map 230 and can satisfy a strong acceleration request of the driver.

On the other hand, if it is decided at step S101 that the running state of the motorcycle 12 after the shift down operation is not a running state belonging to the acceleration running region, then the returning condition decision section 216 decides whether or not the running state of the motorcycle 12 after the shift down operation is a running state belonging to the cruise running region (step S102). In other words, the returning condition decision section 216 decides whether or not the running state decided latest at step S100 is a running state belonging to the cruise running region.

If it is decided at step S102 that the running state of the motorcycle 12 after the shift down operation is a running state belonging to the cruise running region, then the returning condition decision section 216 decides whether or not the predetermined time period for cruise (third predetermined time period) elapses after the running state belonging to the cruise running region is entered after the shift down operation (step S103).

If it is decided at step S103 that the predetermined time period for cruise does not elapse after the running state belonging to the cruise running region is entered, then the processing returns to step S100. However, if it is decided that the predetermined time period for cruise elapses after the running state belonging to the cruise running region is entered, then the processing advances to step S9 of FIG. 12, at which the automatic shift mode returning section 218 automatically returns the shift mode to the automatic shift mode. After the shift mode is returned to the automatic shift mode, the automatic transmission controlling section 184 controls the automatic transmission 168 to change over the shift gear stage based on the automatic shift map 230.

In particular, if the running state of the motorcycle 12 upon the shift down operation is a running state in the deceleration running region and the running state of the motorcycle 12 after the shift down operation is a running state in the cruise running region continuously for the predetermined time period for cruise, then the returning condition decision section 216 decides that the automatic returning condition is satisfied. Thus, the automatic shift mode returning section 218 automatically returns the shift mode to the automatic shift mode.

If the running state of the motorcycle 12 upon the shift down operation is a running state in the deceleration running region and the running state of the motorcycle 12 after the shift down operation is a running state in the cruise running region, then it is considered that the driver wants to carry out cruise running with the shift gear stage after the shift down operation. Therefore, until the running state in the cruise running region continues for the predetermined time period for cruise, the shift mode is not returned to the automatic shift mode. Therefore, cruise running can be carried out with the shift gear stage after the shift down operation. Further, the shift gear stage of the automatic transmission 168 does not change over frequently, and an unfamiliar feeling by frequent speed change is not provided to the driver.

On the other hand, if it is decided at step S102 that the running state of the motorcycle 12 after the shift down operation does not belong to the cruise running region, that is, if the running state of the motorcycle 12 after the shift down operation belongs to a running state in the deceleration running region, then the returning condition decision section 216 decides whether or not the vehicle speed at present is lower than the compulsory shift down vehicle speed (step S104).

If it is decided at step S104 that the vehicle speed at present is not lower than the compulsory shift down vehicle speed, then the processing returns to step S100. However, if it is decided that the vehicle speed at present is lower than the compulsory shift down vehicle speed, then the processing advances to step S9 of FIG. 12, at which the automatic shift mode returning section 218 automatically returns the shift mode to the automatic shift mode. After the shift mode is returned to the automatic shift mode, the automatic transmission controlling section 184 controls the automatic transmission 168 to change over the shift gear stage based on the automatic shift map 230.

In particular, if the running state of the motorcycle 12 upon the shift down operation is a running state in the deceleration running region and the running state of the motorcycle 12 after the shift down operation is a running state in the deceleration running region and besides the vehicle speed is lower than the compulsory shift down vehicle speed, then the returning condition decision section 216 decides that the automatic returning condition is satisfied. Thus, the automatic shift mode returning section 218 returns the shift mode to the automatic shift mode.

Since whether or not the automatic returning condition to the automatic shift mode is satisfied is decided from a manual shift operation for shift up or shift down and running states upon and after the manual shift operation as described above, if the automatic returning condition is satisfied, then the shift mode is automatically returned to the automatic shift mode. Therefore, the shift mode can be automatically returned to the automatic shift mode in accordance with a running request of the driver. Thus, the shift mode can be automatically returned to the automatic shift mode without giving an unfamiliar feeling to the driver.

Now, a changeover operation between the default mode and the quick mode is described with reference to FIG. 20.

The operation illustrated in FIG. 20 is executed in a predetermined cycle when the motorcycle 12 runs in the automatic shift mode of the drive mode. The drive mode changeover section 222 decides whether or not a quick mode changeover condition is satisfied (step S121). If the quick mode changeover condition is not satisfied, then at present, the automatic shift mode of the drive mode is set to the default mode, but if the quick mode changeover condition is satisfied, then the automatic shift mode of the drive mode is set to the quick mode.

If it is decided at step S121 that the quick mode changeover condition is not satisfied (if it is decided that the automatic shift mode of the drive mode is the default mode at present), then the drive mode changeover section 222 decides whether or not the motorcycle 12 enters a running state in the acceleration running region (step S122). In other words, the drive mode changeover section 222 decides whether or not the running state of the motorcycle 12 at present has entered (changed to) a running state in the acceleration running region from a running state in the cruse running region or from a running state in the deceleration running region. In particular, the running state discrimination section 214 decides the running state of the motorcycle 12 in the predetermined cycle, and the drive mode changeover section 222 decides based on a result of the decision whether or not the running state of the motorcycle 12 at present has entered a running state in the acceleration running region. It is to be noted that the running state discrimination section 214 naturally uses the running state discrimination map 232 to decide the running state from the throttle opening and the vehicle speed at present.

If it is decided at step S122 that the running state of the motorcycle 12 at present has not entered a running state in the acceleration running region, then the processing is ended, but if it is decided that the running state of the motorcycle 12 at present has entered a running state in the acceleration running region, then the drive mode changeover section 222 decides whether or not the entering into the acceleration running region within a fixed period of time (for example, within five seconds) has been carried out by three times (a predetermined number of times) or more (step S123). In other words, the drive mode changeover section 222 decides whether or not the operation that, after a running state in the acceleration running region is entered, the running state of the motorcycle 12 at present is once brought out of the running state in the acceleration running region and then enters a running state in the acceleration running region within the fixed period of time is carried out successively, and the number of times by which the acceleration running region is entered is three or more.

More particularly, if a running state in the acceleration running region is entered→the running state in the acceleration running region is quitted→a running state in the acceleration running region is entered again within the fixed period of time after the timing at which the running state in the acceleration running region in the preceding cycle→the running state in the acceleration running region is quitted→a running state in the acceleration running region is entered again within the fixed period of time after the timing at which the running state in the acceleration running region is entered in the preceding cycle, then the drive mode changeover section 222 decides that the entering into the acceleration running region within the fixed period of time has been carried out successively by three times or more.

Figure 22:
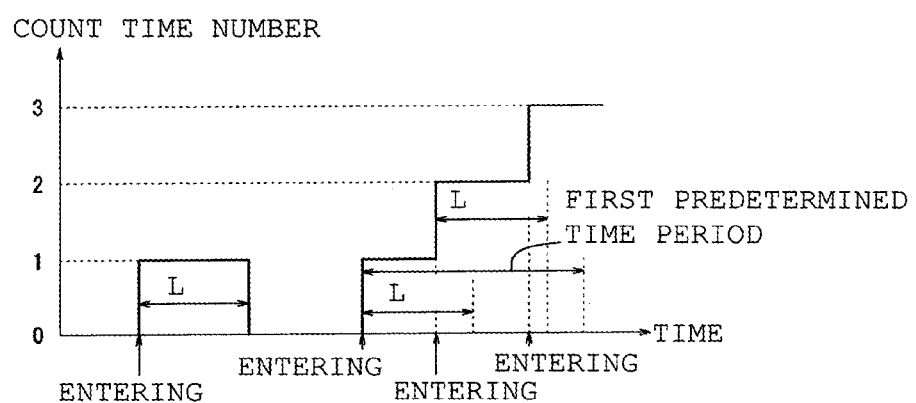
FIG. 22 is a view illustrating a decision regarding entering into an acceleration running region within a fixed period of time has been carried out successively by three times or more in the exemplary embodiment.

In particular, as seen in FIG. 22, the drive mode changeover section 222 counts the number of times by which the motorcycle 12 enters a running state in the acceleration running region, and resets, if the motorcycle 12 does not enter a running state in the acceleration running region within the fixed period of time after the running state in the acceleration running region is entered, the counted number of times (to zero). Then, if the counted time number is three or more, the drive mode changeover section 222 decides that the entering into the acceleration running region within the fixed period of time has been carried out successively by three times or more.

In other words, in order for the drive mode changeover section 222 to decide that the entering into the acceleration running region within the fixed period of time has been carried out successively by three times or more, it is necessary to enter a running state in the acceleration running region at least by three times or more within a first predetermined time period (fixed period of time×2) and besides it is necessary for the distance between two successive timings at which a running state in the acceleration running region is entered to be within the fixed period of time. As a case in which the entering into the acceleration running region within the fixed period of time is carried out successively by three times or more, a case may be applicable in which, for example, the driver successively operates the throttle grip 72 to open and close in a short period of time. It is to be noted that, while it is decided at step S123 whether or not the entering into the acceleration running region within the fixed period of time is carried out successively by three times or more, the number of such times may be a suitable number of times equal to or more than two.

If it is decided at step S123 that the entering into the acceleration running region within the fixed period of time is not carried out successively by three times or more, then the processing is ended. However, if it is decided that the entering into the acceleration running region within the fixed period of time is carried out successively by three times or more, then the drive mode changeover section 222 decides that the quick mode changeover condition is satisfied (step S124).

Then, the drive mode changeover section 222 automatically changes over the automatic shift mode of the drive mode from the default mode to the quick mode (step S125) and then ends the processing. At this time, the drive mode changeover section 222 automatically changes over the shift map from the default mode shift map 250 to the quick mode shift map 252 to automatically change over the automatic shift mode of the drive mode from the default mode to the quick mode. Consequently, if the automatic shift mode of the drive mode is selected, then the automatic transmission controlling section 184 changes over the shift gear stage of the automatic transmission 168 using the quick mode shift map 252.

Along a road over a mountain pass along which a corner successively appears, the speed of the motorcycle 12 is decreased when it advances to a corner but is increased when it leaves the corner, and therefore, an operation of the throttle grip 72 is carried out frequently and deceleration and acceleration are repeated within a predetermined period of time. Therefore, when the motorcycle 12 runs along a road over a mountain pass or the like, it is decided at step S123 that the number of times by which the motorcycle 12 enters a running state in the acceleration running region within the fixed period of time is three times or more, and then the quick mode which attaches importance to the driving force is entered automatically at step S125. Therefore, the necessity for the driver to select the sport mode is eliminated, and the convenience in use is enhanced and driving becomes easy while racy running can be implemented.

If the acceleration running region is entered again within the fixed period of time after a running state in the acceleration running region is entered once, then an operation of the throttle grip 72 is not carried out frequently, and it can be considered that the running then is not cornering running. Therefore, changeover to the quick mode can be prevented by resetting the counter.

On the other hand, if it is decided at step S121 that the quick mode changeover condition is satisfied, then it is decided whether or not the running state of the motorcycle 12 at present is a running state in the cruise running state (step S126). In other words, the running state discrimination section 214 decides the running state of the motorcycle 12 in the predetermined cycle and decides, based on a result of the decision, whether or not the running state of the motorcycle 12 at present is a running state in the cruise running region.

If it is decided at step S126 that the running state of the motorcycle 12 at present is not a running state in the cruise running region, then the processing is ended, but if the running state of the motorcycle 12 at present is a running state in the cruise running region, then the drive mode changeover section 222 decides whether or not the running state in the cruise running region continues for a second predetermined time period (for example, for eight seconds) (step S127).

If it is decided at step S127 that the running state in the cruise running region does not continue for the second predetermined time period, then the processing is ended, but if it is decided that the running state in the cruise running region continues for the second predetermined period of time, then the drive mode changeover section 222 decides that the default mode changeover condition is satisfied (step S128).

Then, the drive mode changeover section 222 changes over the automatic shift mode of the drive mode from the quick mode to the default mode (step S129) and then ends the processing. At this time, the drive mode changeover section 222 automatically changes over the shift map from the quick mode portion 252 of the drive mode shift map 240 to the default mode portion 250 of the drive mode shift map 240 to automatically change over the automatic shift mode of the drive mode from the quick mode to the default mode. Consequently, if the automatic shift mode of the drive mode is selected, then the automatic transmission controlling section 184 uses the default mode portion 250 of the drive mode shift map 240 to change over the shift gear stage of the automatic transmission 168.

If the state of the cruise running region continues for the second predetermined time period, then the driver can decide that, for example, the motorcycle 12 is running comfortably in the city or the like. Therefore, running conforming to the will of the driver can be carried out by automatically changing over the automatic shift mode of the drive mode to the default mode.

It is to be noted that, if an instruction of the sport mode is issued from the ND changeover switch 88 by an operation by the driver, then the drive/sport mode selection section 220 selects the sport mode shift map 242 to select the automatic shift mode of the sport mode. Consequently, the sport mode can be selected when the will of the driver is recognized with certainty. It is to be noted that, where the automatic shift mode of the sport mode is selected, the automatic transmission controlling section 184 changes over the shift gear stage of the automatic transmission 168 using the sport mode shift map 242.

As described above, when the automatic shift mode of the drive mode is selected (set), changeover between the default mode and the quick mode is carried out based on an acceleration history based on the throttle opening. Therefore, in a wide range running state in running along an uphill and a downhill such as a road over a mountain path from running in the city, appropriate running can be provided without using gradient detection means or the like, the necessity for complicated shift operations is eliminated, and besides, smooth running can be implemented.

It is to be noted that, while, in the exemplary embodiment described above, the single running state discrimination map 232 is provided and the running state discrimination section 214 uses the single running state discrimination map 232 to discriminate a running state of the motorcycle 12, the running state discrimination map 232 may be provided for each shift gear stage. In this instance, the running state discrimination section 214 may use the running state discrimination map 232 corresponding to the shift gear stage of the automatic transmission 168 at present to discriminate the running state of the motorcycle 12. By this, discrimination of the running state of the motorcycle 12 can be enhanced.

While the present invention has been described in connection with the exemplary embodiment thereof, the technical scope of the present invention is not limited to the scope of the description of the embodiment above. It is apparent to those skilled in the art that it is possible to apply various alterations and improvements while remaining within the basic gist of the invention. It is apparent from the description of the claims that also such forms to which alterations or improvements are applied as just described can be included in the technical scope of the present invention. Further, reference numerals in parentheses described in the claims are applied in accordance with reference numerals applied in the accompanying drawings in order to facilitate understandings of the present invention, but the present invention shall not be interpreted as being restricted to the elements to which the reference numerals are applied.

DESCRIPTION OF REFERENCE NUMERALS

12 . . . Motorcycle
22 . . . Power unit
70 . . . Left grip
72 . . . Throttle grip
88 . . . ND changeover switch
92 . . . Running mode changeover switch
102 . . . Shift up switch
104 . . . Shift down switch
124 . . . Storage section
154 . . . Throttle valve
156 . . . Engine
158 . . . Injector
160 . . . Ignition plug
166 . . . Crankshaft
168 . . . Automatic transmission
170 . . . Throttle grip opening sensor
172 . . . Throttle opening sensor
174 . . . Speed sensor
176 . . . Gear position sensor
178 . . . Vehicle speed sensor
180 . . . ECU
182 . . . Engine controlling section
184 . . . Automatic transmission controlling section
200 . . . Running mode changeover section
202 . . . Automatic shift mode changeover section
210 . . . Manual operation detection section
212 . . . Manual shift mode changeover section
214 . . . Running state discrimination section
216 . . . Returning condition decision section
218 . . . Automatic shift mode returning section
220 . . . Drive/sport mode selection section
222 . . . Drive mode changeover section
230 . . . Automatic shift map
232 . . . Running state discrimination map
240 . . . Drive mode shift map
242 . . . Sport mode shift map
250 . . . Default mode shift map
252 . . . Quick mode shift map

We claim:

1. A shift controlling apparatus for a vehicle, comprising:
an automatic shift map in which at least shift timings corresponding to vehicle speeds are set and which automatically carries out changeover between a plurality of shift gear stages based on said automatic shift map, said automatic shift map having a drive mode shift map corresponding to ordinary running as a whole and a sport mode shift map which has an increased region in which a speed change ratio is low compared to said drive mode shift map and corresponds to more sporty operation than that of the drive mode shift map, said drive mode shift map having a first mode portion which is a basic shift map and a second mode portion which has an increased region in which a change gear ratio is low compared to said first mode portion, and said increased region of said second mode portion in which the speed change ratio is low compared to said first mode portion, is smaller compared to said increased region of said sport mode shift map;

a mode selection section for selecting one of said drive mode shift map and said sport mode shift map; and a drive mode map changeover section for carrying out, when said mode selection section selects said drive mode shift map, changeover between said first mode portion and said second mode portion based on an acceleration history in accordance with a throttle opening of the vehicle.

2. The shift controlling apparatus according to claim 1, further comprising a running state discrimination section for discriminating whether the vehicle is in a running state in an acceleration running region based on a vehicle speed and the throttle opening of the vehicle, and said drive mode map changeover section counts the number of times by which the vehicle enters a running state in the acceleration running region and carries out, when a running state in the acceleration running region is entered by a predetermined number of times within a first predetermined time period, changeover from said first mode portion to said second mode portion of said drive mode shift map.

3. The shift controlling apparatus according to claim 2, wherein said drive mode map changeover section resets the counter number when, after the vehicle enters a running state in the acceleration running region, the vehicle does not again enter a running state in the acceleration running region within a fixed period of time.

4. The shift controlling apparatus according to claim 2, wherein said running state discrimination section further decides, based on the vehicle speed and the throttle opening, whether or not the vehicle is in a running region of a cruise running region, and said drive mode map changeover section carries out, when the vehicle is in a running state in the cruise running region for a second predetermined time period after changeover to said second mode portion of the drive mode shift map is carried out, changeover to said first mode portion of the drive mode shift map.

5. The shift controlling apparatus according to claim 3, wherein said running state discrimination section further decides, based on the vehicle speed and the throttle opening, whether or not the vehicle is in a running region of a cruise running region, and said drive mode map changeover section carries out, when the vehicle is in a running state in the cruise running region for a second predetermined time period after changeover to said second mode portion of the dive mode shift map is carried out, changeover to said first mode portion of the dive mode shift map.

6. The shift controlling apparatus according to claim 1, wherein said mode selection section selects one of said drive mode shift map and said sport mode shift map in response to a manual operation of a driver.

7. The shift controlling apparatus according to claim 2, wherein said mode selection section selects one of said drive mode shift map and said sport mode shift map in response to a manual operation of a driver.

8. The shift controlling apparatus according to claim 3, wherein said mode selection section selects one of said drive mode shift map and said sport mode shift map in response to a manual operation of a driver.

9. The shift controlling apparatus according to claim 4, wherein said mode selection section selects one of said drive mode shift map and said sport mode shift map in response to a manual operation of a driver.

10. The shift controlling apparatus according to claim 5, wherein said mode selection section selects one of said drive mode shift map and said sport mode shift map in response to a manual operation of a driver.

11. The shift controlling apparatus according to claim 1, wherein said drive mode shift map and said sport mode shift map of said automatic shift map are stored in a storage section associated with an electric control unit of the vehicle.

12. The shift controlling apparatus according to claim 2, further comprising a running state discrimination map which is accessed by said running state discrimination section based on detected values of the speed and the throttle opening of the vehicle to determine if the vehicle is in a running state in the acceleration running region.

* * * * *